US012592373B2

(12) United States Patent
Hock et al.

(10) Patent No.: US 12,592,373 B2
(45) Date of Patent: Mar. 31, 2026

(54) TIME-OF-FLIGHT MASS ANALYSERS

(71) Applicant: Thermo Fisher Scientific (Bremen) GmbH, Bremen (DE)

(72) Inventors: Christian Hock, Bremen (DE); Alexander Wagner, Bremen (DE); Hamish Stewart, Bremen (DE); Dmitry Grinfeld, Bremen (DE); Anastassios Giannakopulos, Bremen (DE); Wilko Balschun, Bremen (DE); Alexander Makarov, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 848 days.

(21) Appl. No.: 17/844,219

(22) Filed: Jun. 20, 2022

(65) Prior Publication Data

US 2022/0415640 A1 Dec. 29, 2022

(30) Foreign Application Priority Data

Jun. 25, 2021 (GB) ...................................... 2109177

(51) Int. Cl.
*H01J 49/40* (2006.01)
*H01J 49/06* (2006.01)
*H01J 49/24* (2006.01)

(52) U.S. Cl.
CPC .......... *H01J 49/406* (2013.01); *H01J 49/068* (2013.01); *H01J 49/24* (2013.01)

(58) Field of Classification Search
CPC .. H01J 49/02; H01J 49/24; H01J 49/40; H01J 49/068; H01J 49/164; H01J 49/406
See application file for complete search history.

(56) References Cited

U.S. PATENT DOCUMENTS 3,095,494 A 6/1963 Denton et al.
3,189,211 A 6/1965 Podlaseck, Jr.
(Continued)

FOREIGN PATENT DOCUMENTS

CN 102763190 A 10/2012
CN 111344833 A 6/2020
(Continued)

*Primary Examiner* — David E Smith
*Assistant Examiner* — Hsien C Tsai

(57) ABSTRACT

The present invention relates to an assembly comprising a vacuum chamber and a time-of-flight mass spectrometer wherein the time-of-flight mass spectrometer is contained within the vacuum chamber. The time-of-flight mass spectrometer comprising a first electrode and a second electrode, the second electrode being spaced apart from the first electrode at a distance defining a portion of an ion-flight path therebetween. The assembly further comprising a first support for supporting the first electrode, the first support arranged between an inner surface of the vacuum chamber and the first electrode. The first support is configured to permit relative movement between at least a portion of the inner surface of the vacuum chamber and the first electrode. The inner surface of the vacuum chamber and the first electrode are thermally coupled. The present invention also relates to a multi-reflection time-of-flight mass analyser. The present invention also relates to an apparatus for out-gassing to remove contaminants from surfaces within a vacuum chamber by heating and subsequently cooling the surfaces.

20 Claims, 12 Drawing Sheets

(56) References Cited

U.S. PATENT DOCUMENTS

| | | | | |
|---|---|---|---|---|
| 6,049,077 | A * | 4/2000 | Franzen | H01J 49/40<br>250/287 |
| 6,998,607 | B1 | 2/2006 | Davis et al. | |
| 2020/0015717 | A1 * | 1/2020 | Taghioskoui | H01J 49/107 |
| 2021/0223147 | A1 * | 7/2021 | Kimoto | G01N 1/40 |

FOREIGN PATENT DOCUMENTS

| | | | | | |
|---|---|---|---|---|---|
| CN | 112088420 | A | | 12/2020 | |
| DE | 19882719 | T1 | | 9/2000 | |
| EP | 0510656 | A2 | | 10/1992 | |
| GB | 1065564 | A | | 4/1967 | |
| GB | 2329066 | A | | 3/1999 | |
| JP | S63264131 | A | | 11/1988 | |
| JP | H01261816 | A | | 10/1989 | |
| SU | 1725289 | | † | 4/1992 | |
| SU | 1725289 | A1 | * | 4/1992 | H01J 49/406 |
| WO | WO-03058673 | A2 | | 7/2003 | |
| WO | WO-2009081444 | A1 | | 7/2009 | |
| WO | WO-2019155542 | A1 | | 8/2019 | |

* cited by examiner
† cited by third party

TIME-OF-FLIGHT MASS ANALYSERS

FIELD OF THE INVENTION

This invention relates to improving the efficiency of bake-out, improving thermal compensation and reducing stress and friction on the components of a time-of-flight mass analyser.

BACKGROUND TO THE INVENTION

In time-of-flight (TOF) mass spectrometry, flight times of ions are measured to determine mass-to-charge (m/z) ratios. As is well known, the time of flight of an ion is proportional to the square root of its mass to charge ratio. The recorded time of detection is linked to the m/z ratio by a calibration function. The ambient temperature of a mass spectrometer can vary by more than 10 degrees Celsius during use, which leads to thermal expansion of the mechanical parts and thermally induced drift of the electronic components (voltage supplies). Variations in temperature of the TOF-MS lead to changes in the measured time of flight of ions of a given species and therefore drifts in the measured m/z of the ions.

Several approaches have been taken in the past to minimize these effects. For example, mass calibration may be frequently updated so that the drift is reasonably accounted for, either using a known analyte or compared to a second, much more stable analyser, as discussed in U.S. Ser. No. 10/593,525B2. Alternatively, the system may be temperature controlled to reduce the drift. However, this increases costs and engineering complexity. By way of further example, in U.S. Pat. No. 6,700,118, several sensors are employed to obtain temperature and strain measurements from the instrument. The measured parameters are then used in conjunction with a mathematical model to provide adjusted mass spectra.

U.S. Pat. No. 6,998,607B1 relates to a thermal compensation scheme in a time-of-flight mass analyser where the analyser is constructed such that although material may be allowed to expand/contract with temperature, their actual ion flight path length remains approximately the same. This is achieved by the use of a spacer attached to the detector, which reduces the distance between the ion source and detector on thermal expansion in order to reduce the flight path length between the ion source and detector. This reduction in flight path compensates for the increase in flight path through the other components of the analyser. However, as a consequence of this arrangement, friction between the spacer and the detector may impede smooth expansion/contraction.

Furthermore, it is noted that it is difficult to apply known thermal compensation methods to multi-reflection time-of-flight mass analysers due to their much longer flight path length. Their much longer flight path length requires excellent vacuum conditions, typically at least an order of magnitude lower pressure than conventional analysers. This therefore requires the vacuum chamber housing the analyser to be baked-out in order to perform outgassing. Bake-out is where the vacuum chamber is heated to 80-120° C. for approximately 4-24 hours. Out-gassing is the consequent removal of contaminants from the inner surfaces of the vacuum chamber during bake-out. To enable the analyser to be used after bake-out, the analyser needs to be cooled. However, efficient heating/cooling requires good thermal coupling between the analyser and the vacuum chamber. In known arrangements, good thermal coupling requires that the inner surface of the vacuum chamber and analyser are firmly fixed together. Consequently, force from the thermal expansion/contraction of the vacuum chamber is then transferred to the analyser thereby exerting stress on the components of the analyser and ruining the effect of the thermal compensation methods employed.

The present invention looks to solve some of these problems of prior art devices.

SUMMARY OF THE INVENTION

In a first aspect of the invention, there is provided an assembly comprising a vacuum chamber and a time-of-flight mass spectrometer, wherein the time-of-flight mass spectrometer is contained within the vacuum chamber,

- the time-of-flight mass spectrometer comprising a first electrode and a second electrode, the second electrode being spaced apart from the first electrode at a distance defining a portion of an ion-flight path therebetween;
- the assembly further comprising a first support for supporting the first electrode, the first support arranged between an inner surface of the vacuum chamber and the first electrode;
- wherein the first support permits relative movement between at least a portion of the inner surface of the vacuum chamber and the first electrode;
- wherein the inner surface of the vacuum chamber and the first electrode are thermally coupled.

The assembly enables the first support to be thermally coupled to the vacuum chamber whilst also enabling the first support to move relative to the vacuum chamber.

During bake-out, the vacuum chamber is heated to remove contaminants from the inner surfaces of the vacuum chamber. To enable the analyser to be used after bake-out, the analyser needs to be cooled. The first aspect of the present invention thermally couples the vacuum chamber and the first electrode of the analyser to enable efficient heating/cooling during bake-out. However, it also reduces stress and friction on components of the analyser, particularly the electrodes, since the vacuum chamber can expand/contract without exerting force on the electrodes as the first support enables the inner surface of the vacuum chamber to move relative to the first electrode. It also prevents the thermal expansion/contraction of the vacuum chamber from significantly impacting the thermal compensation scheme employed for the analyser.

The vacuum chamber comprises or defines a cavity therein, which houses the time-of-flight mass spectrometer.

The inner surface of the vacuum chamber may be any internal surface formed by walls of the vacuum chamber.

The analyser may comprise an ion source and an ion detector. The total ion-flight path is from the ion source to the ion detector (via the first and second ion-optical mirrors).

The first support may be connected to the inner surface of the vacuum chamber. The first support may be directly connected to the inner surface of the vacuum chamber and/or directly connected to the first electrode.

Preferably, the assembly may comprise a second support for supporting a second electrode. The second support may be of a similar configuration to the first support. The second support is arranged between the inner surface of the vacuum chamber and the second electrode, wherein the second support permits relative movement between at least a portion of the inner surface of the vacuum chamber and the second electrode.

The second support may be connected to the inner surface of the vacuum chamber. The second support may be directly connected to the inner surface of the vacuum chamber and/or directly connected to the second electrode.

Preferably, the first and/or second support comprises a surface configured to support the respective electrode thereon, wherein the surface is electrically insulative. The respective electrode may be directly supported on the surface of the support. The first and/or second support may be coated with an electrically insulative material or may be formed entirely of an electrically insulative material to provide the electrically insulative surface.

The first and/or second support permits relative translation of the respective electrode relative to at least a portion of the inner surface of the vacuum chamber. (I.e. the relative movement referred to above may be relative translation). Relative translation may be in any direction.

In one embodiment, the first and/or second support comprises one or more rotatable element(s), each rotatable element having a curved surface configured to support the respective electrode thereon. The curved surface may be electrically insulative. The rotation of the one or more rotatable element(s) may enable relative translation between the electrode(s) and the inner surface of the vacuum chamber. The curved surface may be in direct contact with the respective electrode but not the inner surface of the vacuum chamber. Alternatively, the curved surface may be in direct contact with the respective electrode and the inner surface of the vacuum chamber. For example, each support may comprise a plurality of rotatable elements spaced apart along a longitudinal direction of the respective electrode.

Each rotatable element may be a ball, wherein the ball is received by a holder such that the ball is rotatable relative to the holder and wherein the holder is coupled to the inner surface of the vacuum chamber. The holder may be formed of a flexible material or shaped to impart flexibility. The holder may be directly mounted to the inner surface of the vacuum chamber. The holder may flexibly maintain the position of the respective ball. The holder may limit translation of the respective ball.

Preferably, the inner surface of the vacuum chamber comprises a complementary recess for receiving each rotatable element. The complementary recess may receive the ball and/or holder of the rotatable element.

In an alternative arrangement, each rotatable element may be a cylinder.

In one embodiment, the first support and the second support are integrally formed. In other words, the first support and the second support may form a single, unitary structure.

The first and/or second support may comprise a lubricated layer, which is electrically insulative. The lubricated layer may also be thermally conductive thereby providing the thermal coupling between the electrode(s) and the inner surface of the vacuum chamber. The lubricated layer may extend between the inner surface of the vacuum chamber and the respective electrode. The first support may be a first portion of the lubricated layer and the second support may be a second portion of the lubricated layer. The first and second portions of the lubricated layer may be separated from each other. Alternatively, the first and second portions may form a unitary, lubricated layer such that the first and second supports are integrally formed. The lubricated layer may comprise vacuum grease and/or soft metal, such as indium foil.

The first and/or second support may comprise a layer having a low coefficient of friction and formed of an electrically insulative material, such as low friction plastic/Teflon. The layer may also be thermally conductive. The first support may be a first portion of the layer and the second support may be a second portion of the layer. The first and second portions of the layer may be separated from each other. Alternatively, the first and second portions may form a unitary, lubricated layer such that the first and second supports are integrally formed.

In one embodiment, the first and/or second support comprises one or more wires configured to suspend the respective electrode from the inner surface of the vacuum chamber. Preferably, in this arrangement, the inner surface of the vacuum chamber is an upper surface of the vacuum chamber. The one or more wires may be formed of a thermally conductive material. The one or more wires may be at least partially covered by an electrically insulative material. The one or more wires may be compressed and/or merged at their termini.

In one embodiment, the first and/or second support comprises one or more springs extending between the inner surface of the vacuum chamber and the electrode(s). The one or more springs may be formed of a thermally conductive material. Each spring may extend between a mount connected to the inner surface of the vacuum chamber and a mount connected to the surface of the respective electrode. Alternatively, each spring may extend directly between the inner surface of the vacuum chamber and a surface of the respective electrode.

Preferably, the inner surface of the vacuum chamber and the second electrode are thermally coupled. The thermal coupling between the inner surface of the vacuum chamber and the second electrode may be achieved by the same or different feature used to provide thermal coupling between the inner surface of the vacuum chamber and the first electrode.

In one embodiment, the thermal coupling between the inner surface of the vacuum chamber and either or both of the first and/or second electrodes may be achieved by one or more flexible thermal conductor(s). The flexible thermal conductor(s) enable relative movement between the inner surface of the vacuum chamber and the respective electrode. Preferably, each flexible thermal conductor is connected between the inner surface of the vacuum chamber and the respective electrode.

Preferably, each flexible thermal conductor(s) comprises one or more thermally conductive wires. The plurality of thermally conductive wires may be assembled together, for example braided together, to form a flexible strap. At least a portion of the one or more thermally conductive wires may be covered by an electrically insulative material.

Preferably, each flexible thermal conductor comprises a first mount configured to connect the flexible thermal conductor to the respective electrode and a second mount configured to connect the flexible thermal conductor to the inner surface of the vacuum chamber.

The first and second mounts may be directly connected to the inner surface of the vacuum chamber and the respective electrodes. Alternative, a spacer may be provided between the first mount and the respective electrode and/or between the second mount and the inner surface of the vacuum chamber.

The first mount may be electrically insulated from the respective electrode. For example, at least the surface of the first mount in contact with the respective electrode may be formed of an electrically insulative material. Alternatively, a spacer configured to space apart the first mount and the respective electrode, wherein the spacer formed of an electrically insulative material or has a surface coating formed of an electrically insulating material may be positioned between the first mount and the respective electrode. The first mount may be connected to the respective electrode via a bolt. The bolt may be surrounded by an electrically insulating material.

Preferably, the first and/or second support is thermally conductive thereby thermally coupling the inner surface of the vacuum chamber to the respective electrode. The first and/or second support may be formed of a thermally conductive material, such as a ceramic. In this arrangement, flexible thermal conductors may not be required.

Liquid cooling that may be directly temperature controlled may be employed to thermally couple the inner surface of the vacuum chamber to the electrode(s). For liquid cooling, conduits, such as flexible sealed tubing, may be provided with a coolant flowing therethrough to thermally couple the electrode(s) and the inner surface of the vacuum chamber. The conduits may be connected between the inner surface of the vacuum chamber and the electrode(s). A pump may be provided to circulate the coolant, such as a cooling liquid, through the inner volume of the conduits so that the coolant flows between the inner surface of the vacuum chamber and the electrode(s) via the conduit, efficiently transmitting heat between them.

Flexible bellows that may be directly temperature controlled may be employed to thermally couple the inner surface of the vacuum chamber to the electrode(s). For example, the electrode(s) may be mounted to flexible bellows connected to ports of the vacuum chamber rather than to the inner surface of the vacuum chamber. The flexible bellows may be directly air cooled for temperature control.

The first electrode may be one of a first plurality of electrodes and the second electrode may be one of a second plurality of electrodes where the first plurality of electrodes are spaced apart from the second plurality of electrodes defining the portion of the ion-flight path therebetween.

One or more of the electrodes of the first plurality of electrodes may be supported by a support configured similarly to the first support. In other words, one or more of the electrodes of the first plurality of electrodes may be supported by a respective support that permits relative movement between at least a portion of the inner surface of the vacuum chamber and the respective electrode.

One or more of the electrodes of the second plurality of electrodes may be supported by a support configured similarly to the second support. In other words, one or more of the electrodes of the second plurality of electrodes may be supported by a respective support that permits relative movement between at least a portion of the inner surface of the vacuum chamber and the respective electrode.

Preferably, the time-of-flight mass spectrometer is a multi-reflection time-of-flight mass spectrometer, the multi-reflection time-of flight mass analyser comprising a first ion-optical mirror comprising at least the first electrode and a second ion-optical mirror comprising at least the second electrode, the second ion-optical mirror being spaced apart from the first ion-optical mirror at a distance defining at least the portion of the ion-flight path therebetween.

The first ion-optical mirror may comprise a first plurality of electrodes spaced apart from each other and/or the second ion-optical mirror may comprise a second plurality of electrodes spaced apart from each other. In this arrangement, the first electrode is the furthest electrode of the first plurality of electrodes from the second plurality of electrodes and the second electrode is the furthest electrode of the second plurality of electrodes from the first plurality of electrodes.

Supports for one or more of the electrode(s) of the first and second plurality of electrodes may be employed similarly to the first and second supports.

Alternatively, the time-of-flight mass spectrometer may be a multi-turn time-of-flight mass spectrometer, the multi-turn time-of flight mass analyser comprising a first electrostatic sector comprising at least the first electrode and a second electrostatic sector comprising at least the second electrode, the second electrostatic sector being spaced apart from the first electrostatic sector at a distance defining at least the portion of the ion-flight path therebetween. The multi-turn time-of-flight mass spectrometer may also comprise further pairs of electrostatic sectors configured similarly to the first and second electrostatic sectors. For example, the multi-turn time-of-flight mass spectrometer may comprise third and fourth electrostatic sectors configured similarly to the first and second electrostatic sectors where the fourth electrostatic sector is spaced apart from the third electrostatic sector at a distance defining a portion of the ion-flight path therebetween. Ions may oscillate along a flight path between the first, second, third and fourth electrostatic sectors.

The first electrostatic sector may comprise a first plurality of electrodes spaced apart from each other and/or the second electrostatic sector may comprise a second plurality of electrodes spaced apart from each other.

A support for one or more of the electrodes of the first and second plurality of electrodes may be employed similarly to the first and second supports.

The ion source and detector are preferably mounted to the inner surface of the vacuum chamber. In a less preferred arrangement, the detector may optionally be mounted to the ion-optical mirror or electrostatic sector proximal to the detector but this arrangement would require flexible electrical connections therebetween.

In one preferred embodiment, a thermal compensation scheme is employed. The first electrode has a shift in m/z ratio per Kelvin and the second electrode has a shift in m/z ratio per Kelvin, the assembly further comprises a connector connected to the first electrode at a first connection point and connected to the second electrode at a second connection point, wherein the connector has a shift in m/z ratio per Kelvin, the connector defining a first length between the first and second connection points at a reference temperature, wherein the first length, the positions of the first and second connection points and the material of the connector are selected to compensate for the sum of the shift in m/z ratio per Kelvin in the first and second electrodes.

Thermally coupling the electrode(s) to the vacuum chamber but supporting the electrode(s) such that the electrode(s) can move relative to the vacuum chamber while also employing this thermal compensation scheme enables efficient heating/cooling during bake-out without compromising the accuracy of the analysis or exerting stress or friction on the components of the analyser.

The thermal compensation scheme is particularly advantageous for a multi-reflection time-of-flight mass analyser. As discussed in the background section, it is noted that it is difficult to apply known thermal compensation methods to multi-reflection time-of-flight mass analysers due to their much longer flight path length. In a multi-reflection time-of-flight mass analyser, the majority of the change in ion flight path with temperature occurs due to thermal expansion/contraction of the spaced apart electrodes.

The thermal compensation scheme described achieves efficient thermal compensation in a multi-reflection time-of-flight mass analyser without causing significant friction between the components.

Accordingly, in a second aspect of the invention, there is provided a multi-reflection time-of-flight mass analyser comprising the thermal compensation scheme described above. More specifically, there is provided a multi-reflection time-of-flight mass analyser comprising:

a first ion-optical mirror comprising a first electrode, the first electrode having a shift in m/z ratio per Kelvin, a second ion-optical mirror comprising a second electrode, the second electrode having a shift in m/z ratio per Kelvin, wherein the second ion-optical mirror is spaced apart from the first ion-optical mirror at a distance defining a portion of an ion-flight path therebetween;

a connector connected to the first electrode at a first connection point and connected to the second electrode at a second connection point, wherein the connector has a shift in m/z ratio per Kelvin, the connector defining a first length between the first and second connection points at a reference temperature;

wherein the first length, the positions of the first and second connection points and the material of the connector are selected to compensate for the sum of the shift in m/z ratio per Kelvin in the electrodes of the first and second ion-optical mirrors.

Preferably, the first ion-optical mirror comprises a first plurality of electrodes and/or wherein the second ion-optical mirror comprises a second plurality of electrodes.

Preferably, the first electrode is the furthest electrode of the first plurality of electrodes from the second ion-optical mirror and/or wherein the second electrode is the furthest electrode of the second plurality of electrodes from the first ion-optical mirror.

The below paragraphs apply to thermal compensation scheme when employed in either the first or second aspects of the invention.

A change in temperature leads to expansion/contraction of the electrodes of the mass analyser. This in turn causes a change in the length of the flight path both within and between the spaced apart electrodes of the mass analyser. For example, without the connector in place, the length of the portion of the flight path between the spaced apart electrodes would increase due to thermal expansion of the electrodes.

As the electrodes expand, the length of the flight path within the electrodes would also increase due to the greater width of the electrodes. These changes in length of the flight path in turn leads to a change in the total flight time and consequently a change in the measured m/z of an ion detected by the mass analyser. This is referred to as a shift in m/z ratio per Kelvin (i.e. delta m/z). The change in the length of the flight path due to expansion of each electrode may be determined based on the thermal expansion coefficient of the material, its dimensions and geometry. The flight path length influenced by each electrode may also extend beyond its geometrical length, as a consequence of potential sag between electrodes and into otherwise field free regions. The change in the m/z ratio measured for an ion may be determined on the basis of the determined change in the length of the flight path. It will be appreciated that depending on the geometry of the mass analyser and electrodes, the relationship between the shift in m/z ratio and temperature perturbation (i.e. the shift in m/z ratio per Kelvin) can be positive or negative.

In other words, the first electrode has a shift in m/z ratio per Kelvin associated with it (i.e. the amount of shift in m/z caused by a 1 K temperature change). For example, the first electrode may have a shift in m/z ratio per Kelvin of −0.1 ppm/K. In such a case, a +10 K temperature change would cause a shift in the measured mass of an ion by −1 ppm (parts per million, i.e. 0.0001%). Correspondingly, a −10 K temperature change would cause a shift in the measured m/z ratio of an ion by +1 ppm.

The connector is connected to the first electrode at the first connection point and to the second electrode at the second connection point. The connector cannot translate relative to the electrodes. The first connection point and the second connection point may be points on the electrodes at which the electrodes are (directly or indirectly) coupled to the connectors. The connector may be directly connected to the electrodes by, for example, bolts or pins or screws or glue. Alternatively, the connector may be indirectly connected to the electrodes. Indirect connection of the connector to the electrode refers to an arrangement where the connector and electrode are connected via an intervening or intermediate element. The connector may be connected to the electrodes, for example, via one or more clamp(s) and/or mount(s). The connector may be configured such that it maintains separation between the first and second electrodes, which in turn maintains the separation between the electrodes of the first ion optical mirror and the electrodes of the second ion optical mirror where the mass analyser is a multi-reflection mass analyser. The first connection point is typically fixed on the first electrode and the second connection point is typically fixed on the second electrode. The first connection point is typically a point on the first electrode at the second connection point is typically a point on the second electrode. As discussed above, without the connector in place, thermal expansion of the electrodes would increase the distance between the first and second electrodes. With the connector in place, an increase in width of the electrodes due to their thermal expansion would cause the proximal edges of the electrodes to approach each other thereby reducing the distance between the first and second electrodes. However, thermal expansion of the connector increases the distance between the first and second connection points which therefore compensates for the increased width of the electrodes that would otherwise decrease the spacing between the first and second electrodes. Accordingly, the connector substantially maintains the spacing between the first and second electrodes.

The connector may extend above or underneath the first and/or second electrodes. In other words, the first connection point may be on an upper surface of the first electrode and the second connection point may be on an upper surface of the second electrode. Alternatively, the first connection point may be on a lower surface of the first electrode and the second connection point may be on a lower surface of the second electrode. The connector may optionally extend beyond the outer edge of the first electrode and beyond the outer edge of the second electrode.

With the connector in place, the shift in m/z ratio per Kelvin of the first electrode depends on the thermal expansion coefficient of the material the first electrode is formed from, its dimensions (e.g. length, width and thickness) and the position of the first connection point. As discussed above, it will be appreciated that depending on the geometry of the mass analyser and first electrode, the relationship between the shift in m/z ratio and temperature perturbation (i.e. the shift in m/z ratio per Kelvin) can be positive or negative.

With the connector in place, the shift in m/z ratio per Kelvin of the second electrode depends on the thermal expansion coefficient of the material the second electrode is formed from, its dimensions (e.g. length, width and thickness) and the position of the second connection point. As discussed above, it will be appreciated that depending on the geometry of the mass analyser and second electrode, the relationship between the shift in m/z ratio and temperature perturbation (i.e. the shift in m/z ratio per Kelvin) can be positive or negative.

The shift in m/z ratio per Kelvin of the connector depends on the thermal expansion coefficient of the material it is formed from, its length between the first and second connection points and the positions of the first and second connection points. The length of the connector between the first and second connection points at a reference temperature is referred to as the first length. The reference temperature may be room temperature or any specified temperature. The material of the connector, the length of the connector between the first and second connection points at a reference temperature (the first length) and the positions of the first and second connection points are selected such that the shift in m/z ratio per Kelvin of the connector can compensate for the shift in m/z ratio per Kelvin of the first and second electrodes.

By compensation, it is meant that the shift in m/z ratio per Kelvin of the connector opposes the total shift in m/z ratio per Kelvin of the first and second electrodes. That is to say, the material of the connector, the first length (i.e. the length of the connector between the first and second connection points at a reference temperature) and the positions of the first and second connection points are selected such that the overall m/z shift of the electrodes per degree Kelvin is reduced towards zero.

Preferably, the compensation is such that a sum of the shift in m/z ratio per Kelvin of the connector and the first and second electrodes is less than ±10 ppm/K, preferably less than ±5 ppm/K, more preferably less than ±3 ppm/K, even more preferably less than ±2 ppm/K, most preferably less than ±1 ppm/K.

Where the first electrode is one of a first plurality of electrodes and the second electrode is one of a second plurality of electrodes, the material of the connector, the first length (i.e. the length of the connector between the first and second connection points at a reference temperature) and the positions of the first and second connection points may be selected such that the shift in m/z ratio per Kelvin of the connector can compensate for the total shift in m/z ratio per Kelvin of the first and second plurality of electrodes. For example, the sum of the shift in m/z ratio per Kelvin of the connector and the first and second plurality of electrodes may be less than ±10 ppm/K, preferably less than ±5 ppm/K, more preferably less than ±3 ppm/K, even more preferably less than ±2 ppm/K, most preferably less than ±1 ppm/K.

When employed in the multi-reflection mass analyser, the material of the connector, the first length (i.e. the length of the connector between the first and second connection points at a reference temperature) and the positions of the first and second connection points may be selected such that the shift in m/z ratio per Kelvin of the connector can compensate for the shift in m/z ratio per Kelvin of some or all of the electrodes of the first and second ion-optical mirrors. Preferably, the compensation is such that a sum of the shift in m/z ratio per Kelvin of the connector and some or all of the electrodes of the first and second ion-optical mirrors is less than ±10 ppm/K, preferably less than ±5 ppm/K, more preferably less than ±3 ppm/K, even more preferably less than ±2 ppm/K, most preferably less than ±1 ppm/K.

Preferably, a thermal expansion coefficient of the connector is less than a thermal expansion coefficient of the electrode(s). For example, the thermal expansion coefficient of the connector may be ≤½ the thermal expansion coefficient of the electrode(s), more preferably ≤⅕ the thermal expansion coefficient of the electrode(s), most preferably ≤1⁄10 the thermal expansion coefficient of the electrode(s).

As discussed above, the material of the connector, the first length (i.e. the length of the connector between the first and second connection points at a reference temperature) and the positions of the first and second connection points are selected to compensate for at least the shift in m/z ratio per Kelvin of the electrodes. While the majority of the shift in m/z ratio per Kelvin of the analyser can be attributed to the electrodes, it is noted that the material of the connector, the first length (i.e. the length of the connector between the first and second connection points at a reference temperature) and the positions of the first and second connection points may be selected to also compensate for the shift in m/z ratio per Kelvin of some or all of the components of the analyser e.g. the ion source, detector, spacers etc.

For example, the analyser may further comprise an ion source and a detector where the total ion flight path is between the ion source and the detector, the ion source and the detector may each have a shift in m/z ratio per Kelvin. The material of the connector, the first length (i.e. the length of the connector between the first and second connection points at a reference temperature) and the positions of the first and second connection points may be selected such that the shift in m/z ratio per Kelvin of the connector can compensate for the total shift in m/z ratio per Kelvin of the electrodes, the ion source and the detector. For example, the sum of the shift in m/z ratio per Kelvin of the connector, the first and second plurality of electrodes, the ion source and the detector may be less than ±10 ppm/K, preferably less than ±5 ppm/K, more preferably less than ±3 ppm/K, even more preferably less than ±2 ppm/K, most preferably less than ±1 ppm/K.

The analyser may further comprise one or more spacer(s) positioned between the electrodes configured to define the spacing between the electrodes, each spacer may have a shift in m/z ratio per Kelvin. The material of the connector, the first length (i.e. the length of the connector between the first and second connection points at a reference temperature) and the positions of the first and second connection points may be selected such that the shift in m/z ratio per Kelvin of the connector can compensate for the total shift in m/z ratio per Kelvin of the electrodes and the spacers. For example, the sum of the shift in m/z ratio per Kelvin of the connector, the first and second plurality of electrodes and the spacers may be less than ±10 ppm/K, preferably less than ±5 ppm/K, more preferably less than ±3 ppm/K, even more preferably less than ±2 ppm/K, most preferably less than ±1 ppm/K.

The material of the connector, the first length (i.e. the length of the connector between the first and second connection points at a reference temperature) and the positions of the first and second connection points may be selected such that the shift in m/z ratio per Kelvin of the connector can compensate for the total shift in m/z ratio per Kevlin of the electrodes, the ion source, the detector and the spacers. For example, the sum of the shift in m/z ratio per Kelvin of the connector, the first and second plurality of electrodes, the ion source, the detector and the spacers may be less than ±10 ppm/K, preferably less than ±5 ppm/K, more preferably less than ±3 ppm/K, even more preferably less than ±2 ppm/K, most preferably less than ±1 ppm/K.

The compensation may be such that the total time-of-flight (i.e. the time for the ion to travel along the total ion flight path from the ion source to the detector) remains substantially constant.

Preferably, the connector extends at least transverse to a longitudinal direction of the first electrode. More preferably the connector extends substantially perpendicular to the longitudinal direction of the first electrode. Alternatively, the connector may extend substantially perpendicular to the axis bisecting the angle between the first ion-optical mirror and the second ion-optical mirror. The length of the connector may therefore extend approximately parallel to the direction along which the first and second electrodes are spaced apart (i.e. approximately parallel to the flight-path between the first electrode and the second electrode).

Preferably the connector is rod-shaped, which may have any cross-sectional shape, such as square, circular etc. Alternatively, the connector may be shaped as a planar strip/bar.

Preferably, the connector is a first connector, wherein the analyser further comprises a second connector connected to the first electrode at a third connection point and connected to the second electrode at a fourth connection point, wherein the second connector defines a second length between the third and fourth connection points at the reference temperature, wherein the second connector is spaced apart from the first connector, preferably wherein the second connector is parallel to the first connector.

The second connector may be configured similarly to the first connector and the above description of the first connector equally applies to the second connector.

As discussed in further detail below, in multi-reflection time-of-flight mass analysers, the electrodes of the first ion-optical mirror may be tilted relative to the electrodes of the second ion-optical mirror. The angle of tilt (i.e. the angle between the longitudinal direction of the first electrode and the longitudinal direction of the second electrode) may preferably be 0 to 5 degrees, more preferably 0 to 2 degrees.

Preferably, the second length, the positions of the third connection point and the fourth connection point and a material of the second connector are selected such that the angle between the first electrode and the second electrode is maintained within ±0.01°, preferably ±0.001°, after thermal expansion of the electrodes and connectors.

By employing two connectors spaced apart from each other and selecting the material of the second connector, the positions of the connection points and the lengths of the connectors between the connections points at a reference temperature appropriately, the angle of title between the electrodes of the first ion-optical mirror and the electrodes of the second ion-optical mirror may be substantially maintained despite thermal expansion/contraction of the electrodes and connectors without bending of the electrodes.

Preferably, the second connector is spaced apart from the first connector in a longitudinal direction of the first electrode.

As the electrodes lengthen/contract due to their thermal expansion/contraction along their longitudinal direction, the first connector may move relative to the second connector such that the spacing between the first connector and second connector is adjusted.

Preferably, the second connector is only attached to the first connector via the first and second electrodes. In other words, there may be no direct connection between the first and second electrode. Therefore, the connectors may not constrain expansion/contraction of the electrodes along their longitudinal direction and consequently, the electrodes may not bend on thermal expansion/contraction.

To prevent drift of the electrode assembly out of position, the second connector may be attached to an inner surface of the vacuum chamber preferably at a fixing position between the third and fourth connection points. The second connector may be connected to the vacuum chamber at the fixing position with a bolt/pin/glue. Even though drift of the electrode assembly as a whole within the vacuum chamber is prevented, the first connector may still move relative to the second connector such that the connectors do not restrain lengthening of the electrode(s) on thermal expansion.

The assembly of the first aspect of the invention may further comprise one or more cooling channel(s), the cooling channels arranged to cool surfaces within the vacuum chamber by transporting a cooling medium through the one or more cooling channel(s); a heater arranged to heat the surfaces within the vacuum chamber; and an insulating material surrounding an outer surface of the vacuum chamber.

By providing an insulating material surrounding the outer surface of the vacuum chamber, a heater configured to heat the surfaces within the vacuum chamber and cooling channels arranged to cool surfaces of the vacuum chamber when provided with cooling medium, the vacuum chamber may be heated and subsequently cooled efficiently during bake-out. As discussed above, during bake-out, inner surfaces of the vacuum chamber are heated to remove contaminants therefrom. After heating, the vacuum chamber needs to be cooled before the mass analyser therein can be used. For efficiency, it is important for the mass analyser to be baked-out within a reasonable time frame. The combination of the insulating material, heater and cooling channels configured as discussed above enables both efficient heating and cooling of the vacuum chamber housing the mass analyser.

This arrangement to improve thermal efficiency may be employed together with the features of the first and second aspects of the present invention. This arrangement for efficient heating and cooling is also provided as a third aspect of the present invention.

Accordingly, in the third aspect of the present invention, there is provided an apparatus for out-gassing to remove contaminants from surfaces within a vacuum chamber by heating and subsequently cooling the surfaces, the apparatus comprising:

- the vacuum chamber for housing a mass analyser;
- a heater arranged to heat the surfaces within the vacuum chamber;
- one or more cooling channel(s), the cooling channels arranged to cool the surfaces within the vacuum chamber by transporting a cooling medium through the one or more channel(s); and
- an insulating material surrounding an outer surface of the vacuum chamber.

The below paragraphs apply to the thermal efficiency arrangement when employed in either the first, second or third aspects of the invention.

Out-gassing refers to the process by which contaminants are removed from inner surfaces of the vacuum chamber. It typically occurs during bake-out where the vacuum chamber is heated for 4-24 hours at 80-120° C. The vacuum chamber is then required to be subsequently cooled for use of the analyser housed therein.

The surfaces heated by the heater and cooled by the cooling medium within the cooling channel(s) are the inner surfaces of the vacuum chamber.

The insulating material preferably surrounds the entire outer surface of the vacuum chamber. The insulating material is preferably a foam, for example polyurethane or polypropylene foam.

The heater is preferably positioned between the insulating material and the outer surface of the vacuum chamber. Alternatively the heater may be positioned outside of the insulating material but may comprise one or more conduits arranged to direct hot air into the cavity formed within the vacuum chamber via openings in the walls of the vacuum chamber. Alternatively, the heater may be positioned inside the vacuum chamber (i.e. within the cavity formed by the vacuum chamber).

The cooling medium received by the one more cooling channel(s) may be a gas or a liquid, preferably the cooling medium is air.

The mass analyser may be a time-of-flight mass analyser. Preferably, the mass analyser is the multi-reflection time-of-flight mass analyser of the second aspect described above.

The one or more cooling channel(s) may extend around and/or through the vacuum chamber. Preferably, the one or more cooling channel(s) may extend at least partially through the vacuum chamber and/or at least partially around the outer surface of the vacuum chamber. For example, the one or more cooling channel(s) may extend around an outer periphery of the vacuum chamber.

Preferably, the cooling channels are within the insulating material. In other words, preferably, the cooling channels are covered by and/or at least partially housed within the insulating material.

Optionally, the one or more cooling channels extend between an inlet and an outlet. The inlet and the outlet may be apertures/through-holes formed in one or more walls of the vacuum chamber. Alternatively, the inlet and the outlet may be formed as recesses and/or grooves formed in edges of the walls of the vacuum chamber.

The one or more cooling channels may be formed by a tube. Preferably, the tube may extend between the inlet and the outlet formed as apertures in one or more walls of the vacuum chamber.

In a preferred embodiment, each cooling channel may be formed as a recess within a wall of the vacuum chamber, preferably wherein each cooling channel is formed as a recess in an outer wall of the vacuum chamber, more preferably wherein the recess formed in the outer wall of the vacuum chamber is covered by the insulating material. The recess may extend along at least a portion of the outer wall of the vacuum chamber. Alternatively, each cooling channel may be formed within an inner surface of the insulating material.

Preferably, the one or more cooling channels are configured to actively cool the surfaces within the vacuum chamber during use. For example, at least one of the one or more cooling channels may comprise one or more fan(s) configured to drive the cooling medium through the respective cooling channel. Alternatively/in addition, the one or more cooling channels may comprise one or more pump(s) configured to drive the cooling medium through the respective cooling channel. Normally, the flow of cooling medium through the cooling channels may be restricted except when the fans and/or pumps are activated.

Preferably, the one or more cooling channels may comprise one or more heat sink(s) and/or heat exchangers configured to receive the cooling medium flowing through the cooling channel during use.

The assembly/apparatus may further comprise a controller configured to control activation and termination of the heater and/or of the one or more fan(s), preferably wherein the controller is configured to activate the one or more fan(s) after termination of the heater. Therefore, in use during bake-out, the controller activates the heater such that the heater heats the surfaces within the vacuum chamber. The efficiency of heating the surfaces within the vacuum chamber is improved due to use of the insulating material surrounding the outer surface of the vacuum chamber. Once the contaminants have been removed from the surfaces within the vacuum chamber, the controller terminates operation of the heater and activates the one or more fan(s)/pump(s) such that the flow of the cooling medium is driven through the one or more cooling channel(s) thereby actively cooling the surfaces within the vacuum chamber. This therefore improves the efficiency of cooling the surfaces within the vacuum chamber such that the time taken for bake-out is reduced.

Also described herein is a method of performing out-gassing to remove contaminants from surfaces within a vacuum chamber using an apparatus comprising: a vacuum chamber for housing a mass analyser; a heater arranged to heat the surfaces within the vacuum chamber; one or more cooling channel(s) arranged to cool the surfaces within the vacuum chamber by transporting a cooling medium through the one or more channel(s), the one or more cooling channel (s) comprising one or more fan(s) and/or pumps configured to drive a cooling medium through the one or more cooling channel(s); and an insulating material surrounding an outer surface of the vacuum chamber; the method comprising:

- activating the heater to heat the surfaces within the vacuum chamber for 4 to 24 hours at 80-120 K;
- terminating the heater;
- activating the one or more fan(s) and/or pump(s) to drive the cooling medium through the cooling channel for 4-12 hours.

BRIEF DESCRIPTION OF THE DRAWINGS

The invention may be put into practice in a number of ways and some embodiments will now be described by way of example only and with reference to the accompanying Figures in which:

FIG. 4(*b*) shows a schematic diagram of a perspective view of a flexible thermal conductor that may be employed in the assembly according to the first aspect of the present invention.

DETAILED DESCRIPTION

Figure 1:
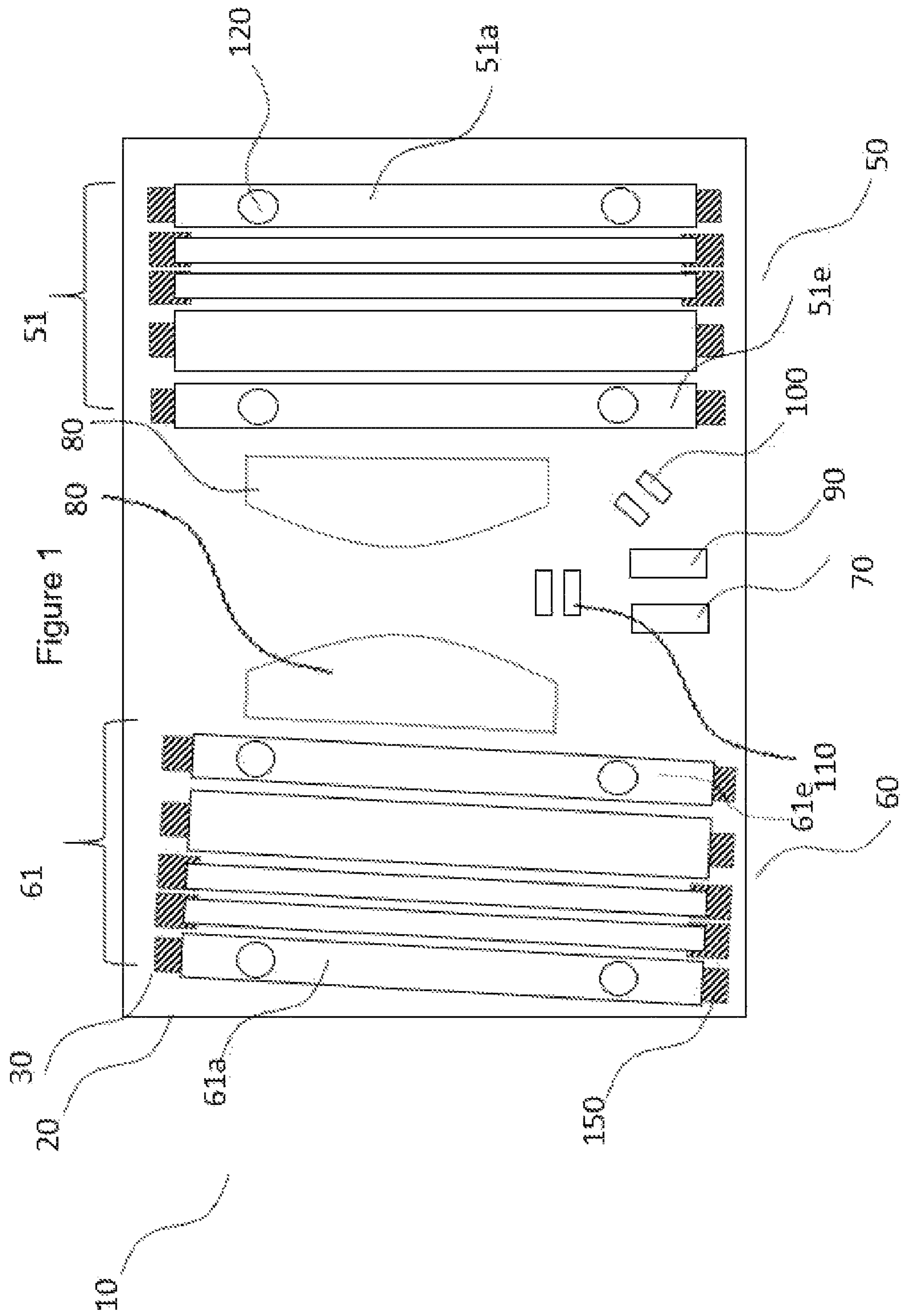
FIG. 1 shows a schematic diagram of a plan view of an assembly according to the first aspect of the present invention when viewed from below.

FIG. 1 is a schematic diagram of a plan view of an assembly 10 in accordance with the first aspect of the present invention comprising a vacuum chamber 20 and a time-of-flight mass analyser 30 where the time-of-flight mass analyser is a multi-reflection time of flight mass analyser (mr-TOF). Although the use of a multi-reflection time of flight mass analyser confers certain advantages, the inventive concept of the first aspect of the present invention described and claimed is equally applicable to any form of time of flight mass analyser, for example multi-turn mass analysers, and the claims are to be construed accordingly. It may also be applied to other types of mass analysers, such as Fourier transform mass analysers, and electrostatic orbital trapping mass analysers, for example in which ions oscillate in a quadro-logarithmic potential.

The mr-TOF 30 is contained/housed within the vacuum chamber 20. The mr-TOF comprises an electrode arrangement 40 forming first and second opposing ion-optical mirrors 50, 60 spaced apart from each other along a distance defining a portion of the ion-flight path therebetween. The first ion-optical mirror 50 comprises a first plurality of electrodes 51 and the second ion-optical mirror 60 comprises a second plurality of electrodes 61. The first electrode 51*a* is the furthest electrode of the first plurality of electrodes 51 from the second ion-optical mirror 60. The second electrode 61*a* is the furthest electrode of the second plurality of electrodes 61 from the first ion-optical mirror 50.

The electrodes 51, 61 are elongated in their longitudinal direction. A longitudinal direction can be defined as a direction generally aligned with the longitudinal axis of the electrodes 51, 61. The transverse direction of the electrode 51, 61 is transverse (across), preferably perpendicular to the longitudinal direction of the electrode 51, 61. The first plurality of electrodes 51 and the second plurality of electrodes 61 are spaced apart from each other along a direction transverse to the longitudinal direction of the electrodes 51, 61.

The first plurality of electrodes 51 (i.e. the electrodes of the first ion-optical mirror 50) are titled relative to the second plurality of electrodes 61 (i.e the electrodes of the second ion-optical mirror 60) as described in U.S. Pat. No. 9,136,101, thereby producing a potential gradient that retards the ions' drift velocity and causes them to be reflected back in the drift dimension (the drift dimension being substantially aligned with the longitudinal dimension of the electrode 51, 61) and focused onto a detector 70. The tilting of the opposing mirrors would normally have the negative side-effect of changing the time period of ion oscillations as they travel down the drift dimension, making achievement of a good ion time-focus difficult. This is corrected with a stripe electrode 80 that alters the flight potential for a portion of the inter-mirror space, varying down the length of the electrodes of the first and second ion-optical mirrors 50, 60. Such correction or compensation electrodes 80 are also described in U.S. Pat. No. 9,136,101. The combination of the varying width of the stripe electrode 80 and variation of the spacing between the first and second ion-optical mirrors 50, 60, allows the reflection and spatial focusing of ions onto the detector 70 as well as maintaining a good time focus.

In use, the ion source 90, such as an ion trap with pulsed ion ejection, injects ions into the first plurality of electrodes 51 of the first ion-optical mirror 50 and the ions then oscillate between the first and second ion-optical mirrors 50, 60. The angle of ejection of ions from the ion source 90 and additional deflectors 100, 110 allow control of the energy of the ions in the drift direction, such that ions are directed down the length of the electrodes 51, 61 of the first and second ion-optical mirrors 50, 60 as they oscillate, producing a zig-zag trajectory. The total ion flight path is from the ion source 90 to the detector 70.

Figure 2:
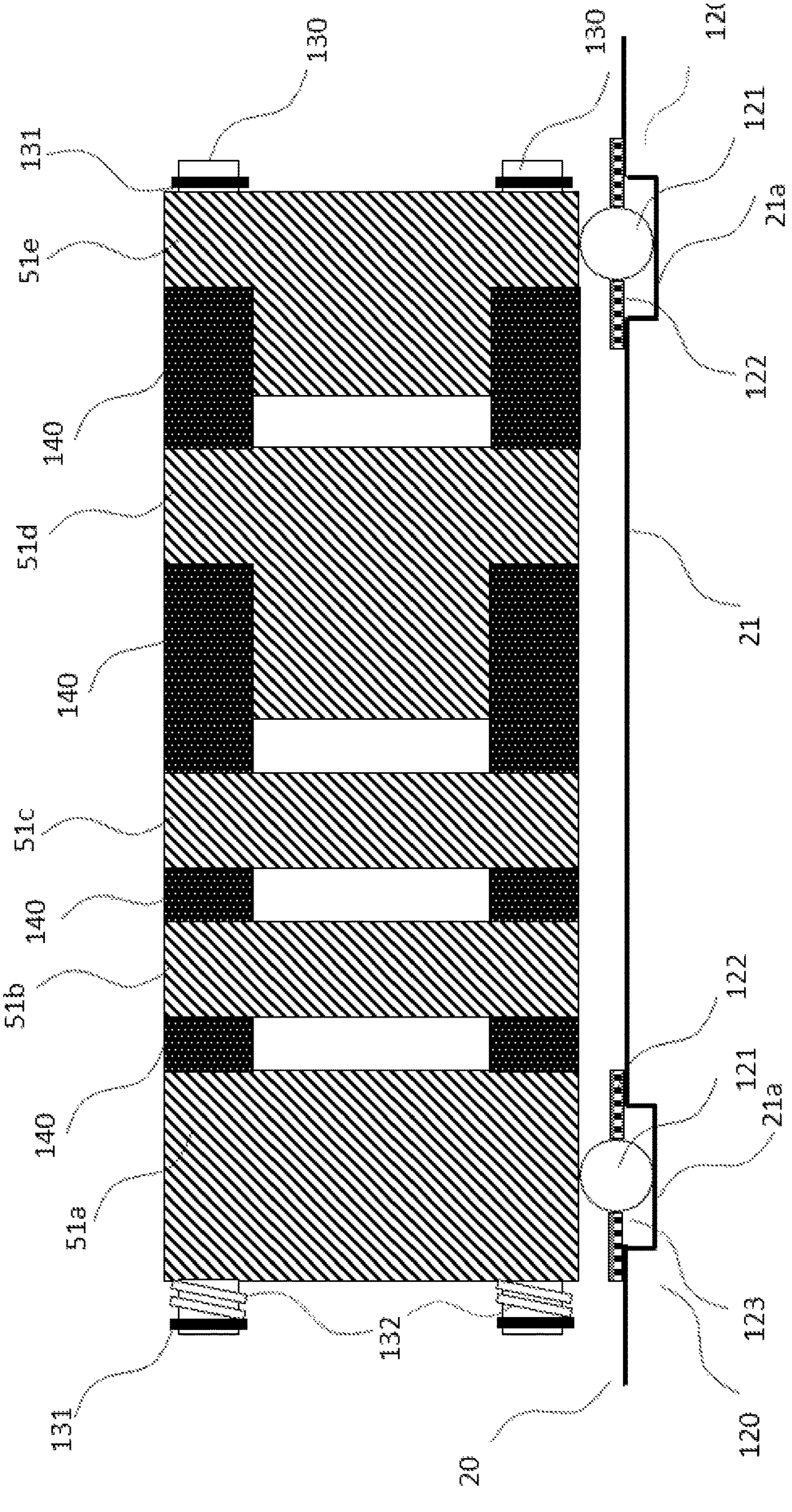
FIG. 2 shows a schematic diagram of an end view of part of the assembly according to the first aspect of the present invention, the assembly comprising first and second supports supporting first and second electrodes, respectively, the assembly further comprising flexible thermal conductor(s) thermally coupling the electrodes to the inner surface of the vacuum chamber.

FIG. 2 depicts an end-on view the electrodes 51 of the first-ion optical mirror 50 together with part of the inner surface of the vacuum chamber 20. The inner surface 21 of the vacuum chamber 20 in this preferred arrangement is a bottom surface of the vacuum chamber 20 (i.e. a floor of the vacuum chamber).

As best shown in FIG. 2, some of the electrodes of the first plurality of electrodes 51*a*, 51*b*, 51*c*, 51*d* are supported by a support 120 arranged between an inner surface 21 of the vacuum chamber 20 and the respective electrode 51, 61. The support 120 permits relative movement between at least a portion of the inner surface 21 of the vacuum chamber 20 and the respective electrode 51. In the preferred embodiment depicted in FIG. 2, the support comprises a ball 121 that is held in position by a holder 122 which is flexible. The holder 122 may limit lateral translation of the ball 121 received therein. The holder 122 may be formed of a flexible material or may be shaped to impart flexibility. The holder 122 may be formed of laser cut and then folded sheet metal. The holder may alternatively be formed of Teflon. The ball 121 can rotate thereby enabling relative movement between the respective electrode 51, 61 it is supporting and the inner surface 21 of the vacuum chamber 20. For example, the ball 121 enables the respective electrode 51, 61 it is supporting to translate in both its longitudinal direction and transverse direction relative to the inner surface 21 of the vacuum chamber 20.

In the preferred embodiment depicted in FIG. 2, the holder 122 has an opening 123 configured to receive the ball 121 therein. In the preferred arrangement shown in FIG. 2, the inner surface 21 of the vacuum chamber comprises a recess 21*a* that receives the ball 121 therein. The holder 122 preferably extends across the recess 21*a* formed within the inner surface 21 of the vacuum chamber 20 such that the holder contacts and/or is fixed to the inner surface 21 of the vacuum chamber 20 on either side of the recess 21*a*. The holder 122 may be generally planar. As discussed above, flexibility of the holder 122 (by virtue of being formed of a flexible material or being shaped to impart flexibility) may enable the holder 122 to flex laterally to permit limited lateral translation of the ball 121 by rotation.

Figure 3:
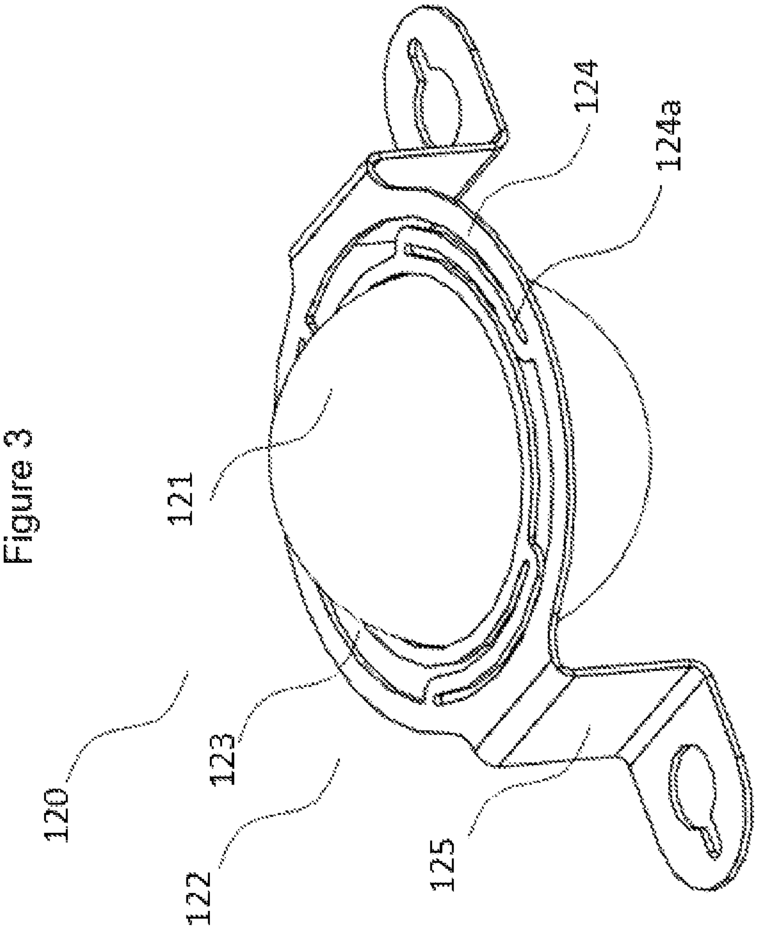
FIG. 3 shows a schematic diagram of a support that may be used in the assembly according to the first aspect of the present invention.

A schematic diagram for an alternative configuration of the holder 122 of the support 120 is shown in FIG. 3. In the optional arrangement shown in FIG. 3, the holder 122 has an opening 123 configured to receive the ball 121 therein. The holder comprises a generally planar element 124 defining the opening and comprises one or more flexible protrusions 124*a* extending into the opening 123 configured to flexibly retain the ball 121. The protrusions 124*a* may be arranged radially and/or may extend around the ball. The holder further comprises one or more lateral flanges 125 extending from the generally planar element 124 for affixing the holder 122 to the inner surface 21 of the vacuum chamber 20. The one or more flanges 125 may be affixed to the inner surface 21 of the vacuum chamber 20 within the recess 21*a* or on either side of the recess 21*a*.

The ball 121 is preferably formed of or is coated with an electrically insulative material, such as a ceramic such that the ball 121 is electrically insulated from the electrode it supports. The holder 122 may be formed of, for example, a metallic material.

Similar supports 120 may be employed for the second plurality of electrodes 61, which are not shown in FIG. 2.

As best shown in FIG. 1, which is a plan view of the assembly when viewed from below where the holder 122 of the supports 120 and the inner surface 21 of the vacuum chamber 20 are not shown, one or more of the first and second plurality of electrodes 51, 61, may comprise multiple balls 121 employed as supports 120. For example, a first ball 121 may be positioned proximal to a first end of an electrode 51, 61 and spaced apart from a second ball 121 positioned proximal to a second end of the electrode 51, 61 along the longitudinal direction of the electrode 51, 61. In this preferred arrangement, the electrode 51*a* of the first ion-optical mirror 50 furthest from the second ion-optical mirror 60 (i.e. the first electrode 51*a*) and the electrode of the first-ion optical mirror 51*e* proximal to the second ion-optical mirror 60 are supported by one or more of the supports 120 described above. Similarly, the electrode 61*a* of the second ion-optical mirror 60 furthest from the first ion-optical mirror 50 (i.e. the second electrode 61*a*) and the electrode 61*e* of the second ion-optical mirror proximal 60 to the first ion-optical mirror 50 are supported by one or more of the supports 120 described above.

As best shown in FIG. 2, the electrodes of the first plurality of electrodes 51 may be mounted on a first pair of mounting rods 130, which may be formed of a ceramic material. The electrodes of the first plurality of electrodes 51 may comprise suitable tolerance holes and/or slots configured to receive the mounting rod 130 such that contact surfaces of the mounting rods 130 to the electrodes 51, 61 mounted thereon are limited. Such an arrangement reduces friction between the electrodes 51, 61 and the mounting rods 130. In an optional alternative arrangement, the mounting rods 130 are formed of anodised aluminium rods preferably coated with an electrically insulative material. Such an arrangement may lead to reduced friction between the electrodes 51, 61 and the mounting rods 130. However, forming the mounting rods 130 of ceramic materials is preferred. Each electrode of the first plurality of electrodes 51 are spaced apart from adjacent electrode(s) of the first plurality of electrodes by spacers 140 therebetween. The spacers 140 are herein referred to as electrode spacers 140. The electrode spacers 140 are preferably formed of an electrically insulative material, such as a ceramic. An end stop 131 is preferably provided at each end of each mounting rod 130 to retain the electrodes 51 on the mounting rod 130. A resilient element 132, for example a spring, may also be mounted on the mounting rod between the end stops. The resilient element 132 may be biased to maintain contact between each of the electrodes 51 and their adjacent spacer (s) 140. Expansion or retraction of the electrodes 51 and/or movement of the electrodes 51 along an axis parallel to the mounting rods 130 may be accommodated by expansion or contraction of the resilient element 132. A similar arrangement may be employed for the second plurality of electrodes 61, which are not shown in FIG. 2.

Figure 4A:
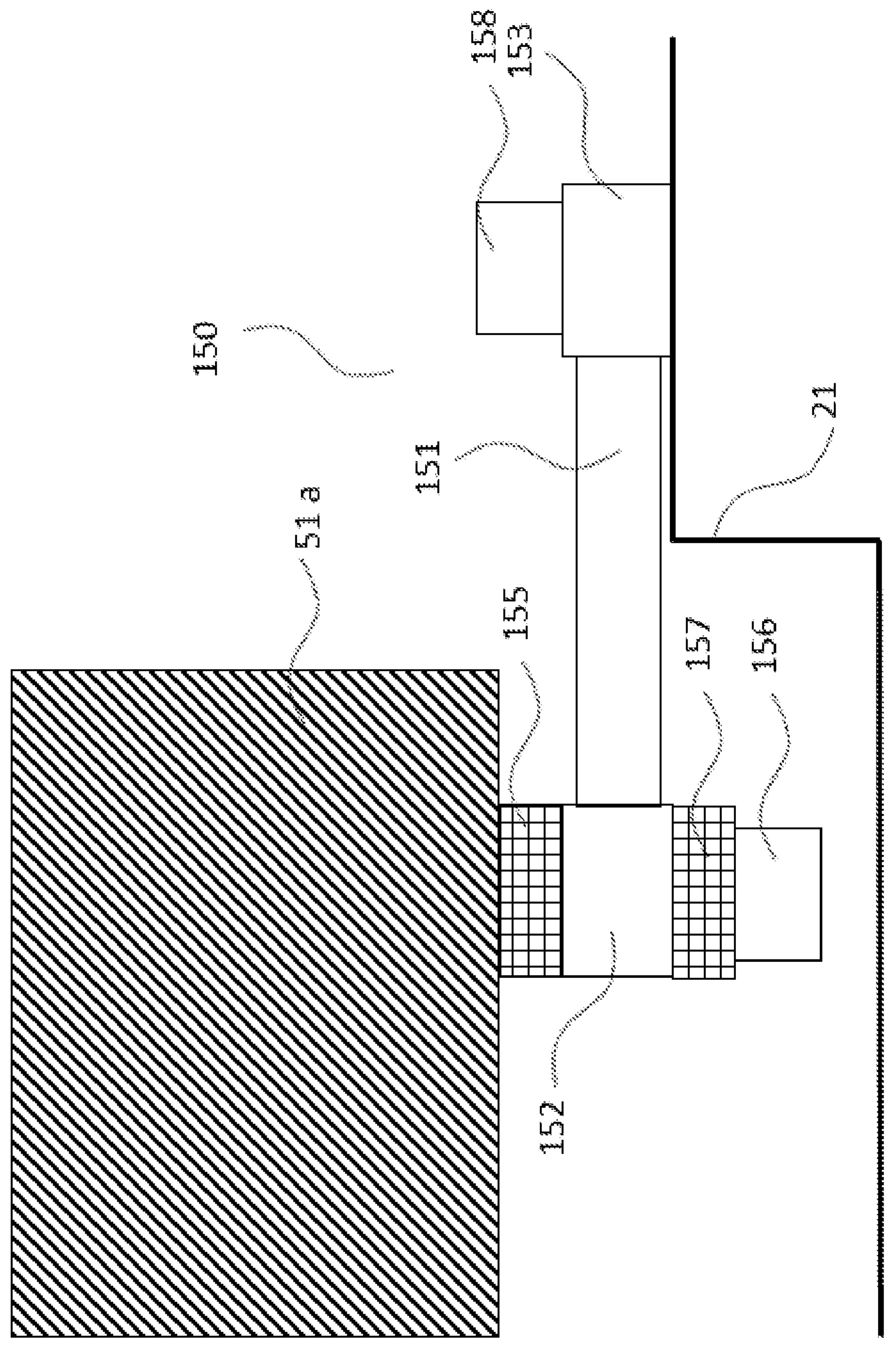
FIG. 4(*a*) shows a schematic diagram of an end view of part of the assembly according to the first aspect of the present invention.
Figure 4B:
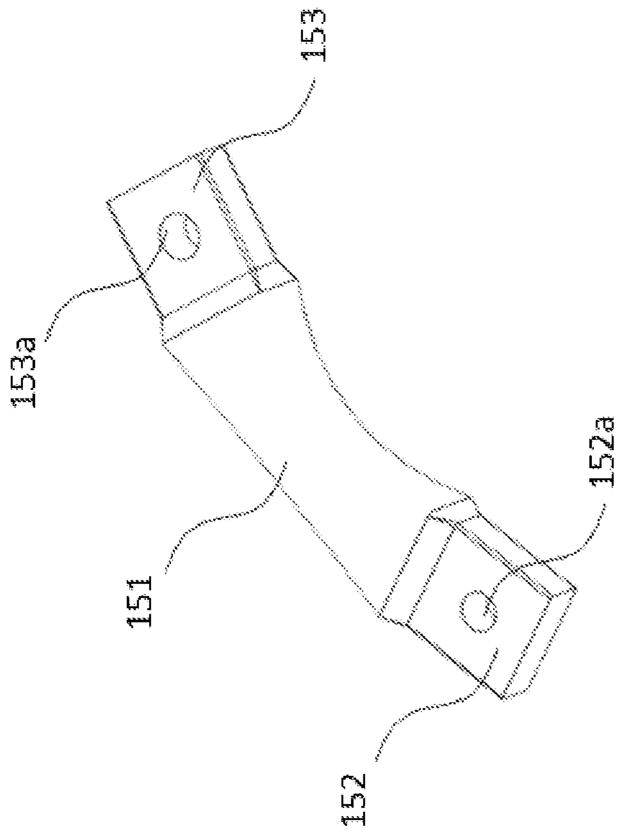

In the embodiment shown in FIG. 1, each of the electrodes of the first and second plurality of electrodes 51, 61 are preferably thermally coupled to the inner surface 21 of the vacuum chamber 20 by a respective flexible thermal conductor 150. The flexible thermal conductor 150 is best shown in FIGS. 4(*a*) and (*b*). FIG. 4(*a*) depicts an end on view of part of the assembly of FIGS. 1 and 2 comprising one electrode (the first electrode 51*a*) of the first plurality of electrodes 51, the flexible thermal conductor 150 and part of the inner surface 21 of the vacuum chamber 20. FIG. 4(*b*) depicts a perspective view of the flexible thermal conductor 150. The term "flexible" in respect of the flexible thermal conductor 150 refers to the ability of the flexible thermal conductor 150 to bend/move in normal use without breaking such that the flexible thermal conductor 150 does not impede movement of the electrode(s) 51, 61 relative to the inner surface 21 of the vacuum chamber 20.

Each flexible thermal conductor 150 may comprise a plurality of wires. The plurality of wires may be braided together to form a flexible strap 151. Preferably at least an upper surface of the plurality of wires are covered with an electrically insulative material, such as Teflon, which has been found to protect against voltage breakdown without significant impact on vacuum quality. The plurality of wires may be completely surrounded by an electrically insulative material, such as Teflon. The one or more wires may be compressed and/or merged at their termini.

Each flexible thermal conductor may comprise a first mount 152 configured to connect the flexible thermal conductor 150 to the respective electrode 51, 61 and a second mount 153 configured to connect the flexible thermal conductor to the inner surface 21 of the vacuum chamber 20. The thermally conductive wires 151 may extend between the first mount 152 and the second mount 153. The one or more wires may be compressed and/or merged at their termini into the first and/or second mounts 152, 153. For example, the first and second mounts 152, 153 may be formed of the compressed and/or merged wires. The first mount 152 and the second mount 153 are typically formed of a thermally conductive material, such as copper. The first mount 152 is preferably electrically insulated from the respective electrode 51, 61. In this arrangement, the first mount 152 is electrically insulated from the respective electrode 51, 61 by a spacer 155 arranged between the first mount 152 and the respective electrode 51, 61. The spacer 155 is referred to herein as an insulative spacer 155 and is preferably formed of an electrically insulative but thermally conductive material, such as a ceramic. Aluminium nitride may be a preferred material for the insulative spacer 155, since it has high thermal conductivity in addition to being electrically insulative.

The flexible thermal conductor 150 may be connected to the respective electrode 51, 61 using bolts/screws 156 extending through an opening 152*a* in the first mount 152 and extending through an opening (not shown) in the respective electrode 51, 61. The openings are preferably threaded. As shown in FIG. 4(*a*), at least the portion of the bolt 156 received within the opening 152*a* in the first mount 152 may be surrounded by an electrically insulative layer 157 to electrically insulate the bolt 156 from the flexible thermal conductor 150. The electrically insulative layer 157 may optionally also be thermally conductive.

The electrically insulative spacer 155 between the first mount 152 of the flexible thermal conductor 150 and respective electrode 51, 61 and the electrically insulative layer 157 around the bolt 156 prevent voltage breakdown which may otherwise occur due to electrical contact between the wires of the flexible thermal conductor 150 and the respective electrode 51, 61.

The second mount 153 may be connected using bolts/ screws 158 to the inner surface of the vacuum chamber extending through an opening 153*a* in the second mount and a corresponding opening (not shown) in the inner surface 21 of the vacuum chamber 20.

As shown best in FIG. 1, preferably flexible thermal conductors 150 are connected proximal to each end of the respective electrode 51, 61, such that each electrode 51, 61 is thermally connected to the inner surface 21 of the vacuum chamber 20 by two thermal flexible thermal conductors 150 spaced apart along the longitudinal direction of the electrode 51, 61. Preferably the flexible thermal conductors 150 have a cross-section selected to enable sufficient thermal coupling to the electrodes for efficient heating and cooling of the electrodes 51, 61 during bake-out. Preferably, the flexible thermal conductors 150 have a cross-sectional area of 20-400 $mm^2$ that enables efficient heat transfer between the electrodes 51, 61 and the inner surfaces 21 of the vacuum chamber 20.

Figure 5:
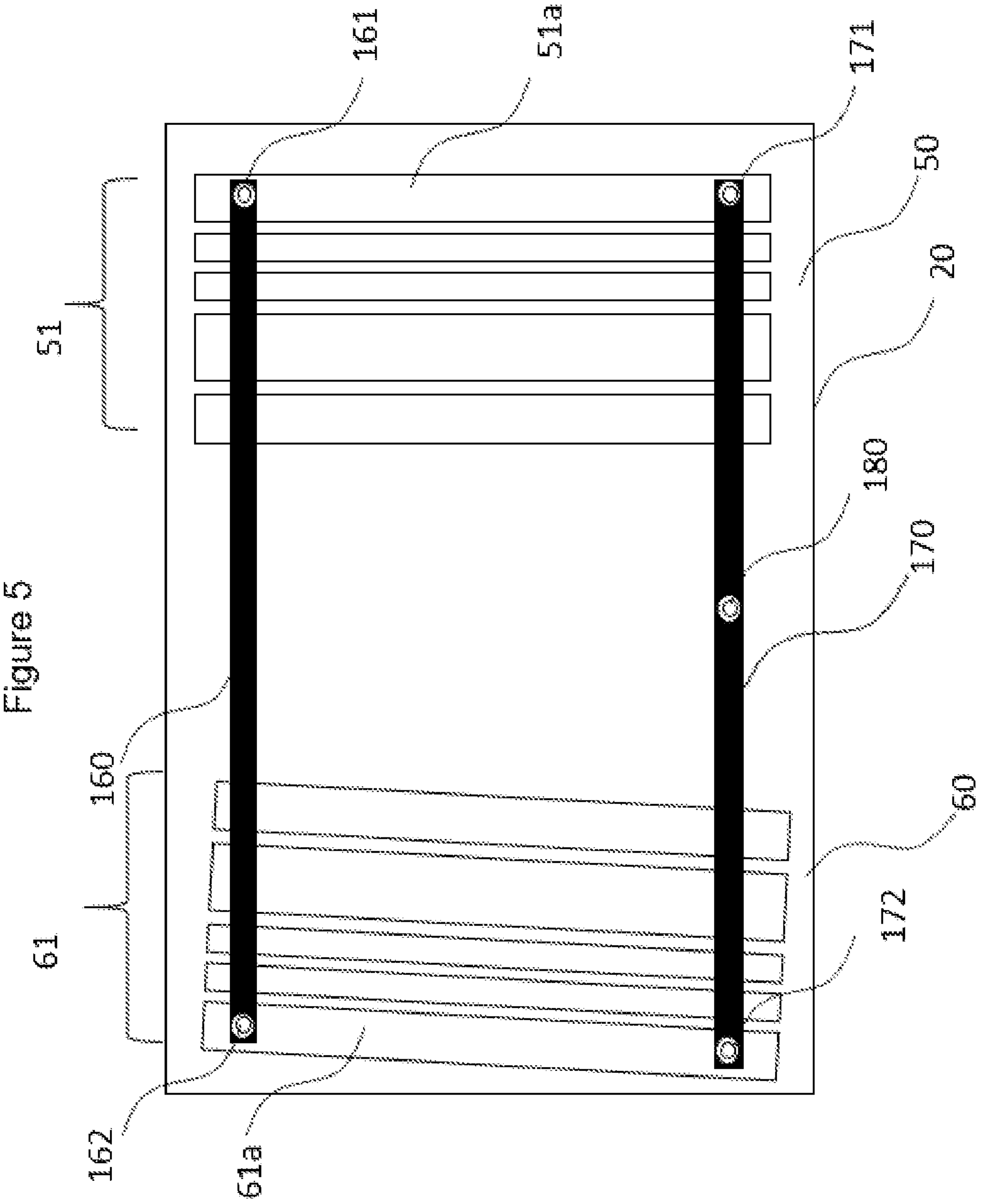
FIG. 5 shows a schematic diagram of a plan view of part of an assembly according to the second aspect of the present invention when viewed from below.

FIG. 5 depicts an arrangement according to the second aspect of the invention that may be employed in the mr-TOF analyser of FIG. 1.

The second aspect of the invention provides a thermal compensation scheme.

The electrodes of the second aspect of the invention are configured similarly to the electrode arrangement described in accordance with the first aspect of the invention. As described above, the electrodes 51, 61 form first and second opposing ion-optical mirrors 50, 60 spaced apart from each other along a distance defining a portion of the ion-flight path therebetween. The first ion-optical mirror 50 comprises a first plurality of electrodes 51 and the second ion-optical mirror 60 comprises a second plurality of electrodes 61. The first electrode 51*a* is the furthest electrode of the first plurality of electrodes 51 from the second ion-optical mirror 60. The second electrode 61*a* is the furthest electrode of the second plurality of electrodes 61 from the first ion-optical mirror 50.

The electrodes 51, 61 are elongated in their longitudinal direction. A longitudinal direction can be defined as a direction generally aligned with the longitudinal axis of the electrode 51, 61. The transverse direction of the electrode is transverse (across), preferably perpendicular to the longitudinal direction. The first plurality of electrodes 51 and the second plurality of electrodes 61 are spaced apart from each other along a direction transverse to the longitudinal direction of the electrodes 51, 61.

Figure 11:
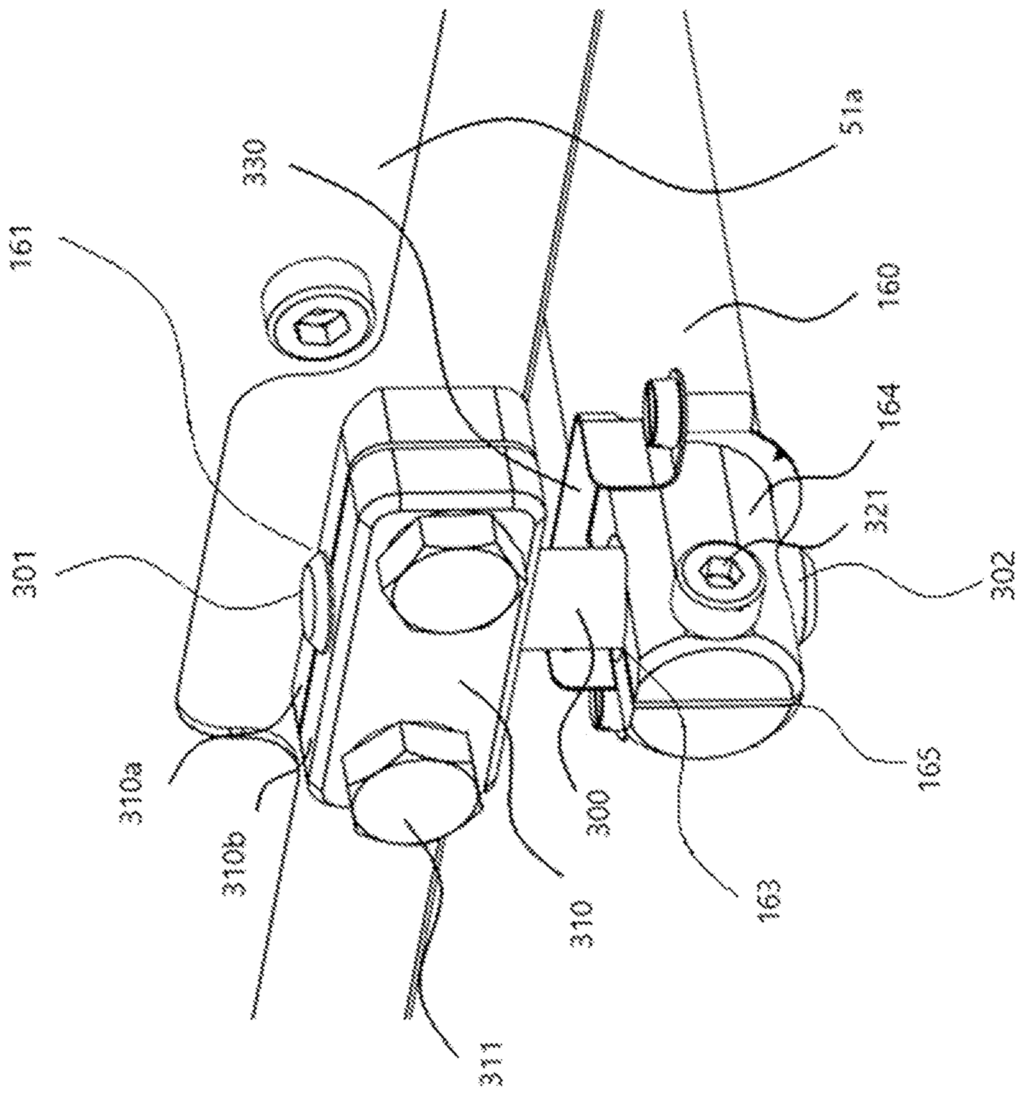
FIG. 11 is a schematic diagram of a perspective view of a part of an assembly according to the second aspect of the present invention.

A first connector 160 is connected to the first electrode 51*a* at a first connection point 161 and connected to the second electrode 61*a* at a second connection point 162. The first connector 160 is fixed to the first and second electrodes 51*a*, 61*a* at the first and second connection points 161, 162 such that the first connector 160 cannot translate relative to the electrodes 51*a*, 61*a*. The first connector 160 defines a first length between the first connection point 161 and the second connection point 162 at a reference temperature, which may be room temperature. The first connector 160 maintains the separation between the first and second electrodes 51*a*, 61*a*, which in turn maintains the separation/ spacing between the first and second ion-optical mirrors 50, 60. The first connection point 161 and the second connection point 162 are fixed points on the electrodes 51*a*, 61*a* at which the first connector 160 is fixed to the electrodes 51*a*, 61*a*. The first connector 160 has corresponding points thereon corresponding to the first and second connection points 161, 162 on the electrodes 51*a*, 61*a*. In this preferred arrangement, the first connector 160 is arranged underneath the first and second electrodes and the first and second connection points 161, 162 are arranged on the lower surfaces of the electrodes 51*a*, 61*a*. The first connector 160 is connected to the first and second electrodes at the first and second connection points preferably using dowel pins received within corresponding openings in the electrodes. Alternatively, in an optional arrangement, the first connector 160 may be connected to the first and second electrodes at the first and second connection points using bolts or clamps. Although the first and second connection points 161, 162 are shown as being on the lower surfaces of the first and second electrodes 51*a*, 61*a*, respectively, they may instead be provided on outer edges of the respective electrode 51*a*, 61*a*. For example, the first connection point 161 may be on the outer edge of the first electrode 51*a* (i.e. on the edge extending along the longitudinal direction of the first electrode 51*a* that is distal from the second electrode 61). Similarly, the second connection point 162 may be on the outer edge of the second electrode 61*a* (i.e. on the edge extending along the longitudinal direction of the second electrode 61*a* that is distal from the first electrode 51*a*). In such an arrangement, the connector 160 may be indirectly coupled to the first and second electrodes 51*a*, 61*a* such as with one or more clamp(s) and/or mount(s). For example, as shown in FIG. 11, the connector 160 may be indirectly coupled to the first electrode 51*a* using a connecting pin 300 having a first end 301 that is clamped by an electrode clamp 310 fixed to the outer edge of the first electrode 51*a* and a second end 302 that is received and clamped in a through-hole 163 formed in a first end 164 of the connector 160. The first end 164 of the connector 160 is proximal to the first electrode 51*a*. The electrode clamp 310 may be formed of first and second parts 310*a*, 310*b* that may be complementary. The first part 310*a* may be fixed to the outer edge of the first electrode 51*a*, for example with adhesive, and the second part may be coupled to the first part using one or more fixing(s), referred to herein as a first fixing 311, such as screws/bolts. The first and second parts 310*a*, 310*b* may be configured to receive the connecting pin 300 therebetween when assembled together. As shown in FIG. 11, tightening of the first fixing 311 may clamp the connecting pin 300 between the first and second parts 310*a*, 310*b* of the electrode clamp 310. As shown in FIG. 11, the through-hole 163 is configured to receive the connecting pin 300 therein and has an adjustable diameter. The diameter of the through-hole 163 may be reduced during assembly to clamp the connecting pin 300 within the through-hole 163. The diameter of the through-hole 163 may be adjusted by changing the width of a slot 165 formed in the connector 160 where the slot 165 intersects the through-hole 163. The width of the slot 165 can be adjusted by one or more fixing(s), referred to herein as second fixing 321, bridging the slot 165 (i.e. extending across the slot 165). Tightening of the second fixing 321 may reduce the width of the slot 163 and so reduce the diameter of the through-hole 163 thereby clamping the connecting pin 300 in the through-hole 163. In the specific embodiment shown in FIG. 11, the first fixing 311 is a pair of screws and the second fixing 321 is a single screw. As shown in FIG. 11, the first fixing 311 may exert a clamping force on the first end 301 of the connecting pin 300 that is perpendicular to the clamping force exerted on the second end 302 of the connecting pin 300 by the second fixing 312 (when tightened). In the arrangement shown in FIG. 11, the first connection point 161 is a point on the outer edge of the electrode 51*a* proximal to the electrode clamp 310. As shown in FIG. 11, the electrode clamp 310 is on the outer edge of the first electrode 51*a*. This is advantageous as the electrode clamp 310 would be easily accessible for tightening with a spanner compared to an arrangement where the means used to connect the first electrode 51*a* and the first connector 160 is positioned on lower surfaces of the first electrode 51*a*. It is also preferable to use clamps and/or mounts for securing the first connector to the first electrode 51*a* compared to a dowel pin and corresponding opening in the first electrode 51*a* due to ease of assembly. Furthermore, the movement/play of the dowel pin within the opening may lead undesirable friction between the dowel pin and the first electrode 51*a*. The connector 160 may be connected to the second electrode 61*a* similarly using a further electrode clamp 310, connecting pin 300 and slot formed in a second end of the connector 160 proximal to the second electrode 61*a*.

The first connector 160 has a longitudinal direction extending transverse (i.e. not parallel) to the longitudinal direction of the electrodes 51, 61 such that the connector extends across the space between the first and second ion-optical mirrors 50, 60. The longitudinal direction of the first connector 160 is arranged substantially perpendicular to the longitudinal direction of the electrodes 51 of the first ion-optical mirror 50. Substantially perpendicular refers to an angle of approximately 90°. The angle between the longitudinal direction of the electrodes 61 of the second ion-optical mirror 60 and the first connector 160 is less than 90°, preferably 85 to 89.99°, more preferably 89.90-89.98°. In this arrangement, the first connector 160 is shaped as a rod having a circular cross-section.

In the preferred arrangement shown in FIG. 5, the electrode arrangement further comprises a second connector 170 spaced apart from the first connector 160 and connected to the first electrode 51*a* at a third connection point 171 and connected to the second electrode 61*a* at a fourth connection point 172. The second connector 170 is substantially parallel to the first connector 160. The second connector 170 is spaced apart from the first connector 160 along the longitudinal direction of the electrodes 51, 61. The second connector 170 is configured similarly to the first connector 160 as discussed above.

The third connection point 171 is preferably aligned with the first connection point 161 along the longitudinal axis of the first electrode 51*a*. The fourth connection point 172 is preferably aligned with the second connection point 162 along the longitudinal axis of the second electrode 61*a*.

As discussed above, a change in temperature leads to expansion/contraction of the electrodes 51, 61 of the mass analyser. This in turn causes a change in the length of the flight path both within and between the spaced apart electrodes 51, 61 of the mass analyser. For example, without the connector(s) 160, 170 in place, as the electrodes expand, the flight path within the electrodes 51, 61 would increase due to the greater width of the electrodes 51, 61 and greater distance between the first and second ion-optical mirrors 50, 60. This change in flight path length in turn leads to a change in total time-of-flight for an ion and so a change in the m/z ratio of an ion detected by the mass analyser (i.e. a shift in m/z ratio per Kelvin).

However, with the connectors 160, 170 in place, this shift in m/z ratio per Kelvin is compensated for. Indeed, with the connector(s) 160, 170 in place, an increase in width of the electrodes 51, 61 due to their thermal expansion would cause the proximal edges of the spaced apart electrodes 51, 61 to approach each other thereby decreasing the distance between the first and second ion-optical mirrors 50, 60. However, thermal expansion of the connector(s) 160, 170 increases the distance between the first and second connection points 161, 612 (and third and fourth connection points 171, 172) to compensate for the increased width of the electrodes 51, 61 that would otherwise decrease the spacing between the first and second ion-optical mirrors 50, 60. Accordingly, the connector(s) 160, 170 substantially maintain the spacing between the first and second ion-optical mirrors 50, 60.

Each electrode 51, 61 therefore has a shift in m/z ratio per Kelvin that may be determined based on the thermal coefficient of expansion of the material it is formed from, its dimensions, geometry, and it's respective connection point 161, 162, 171, 172.

The material of the first and second connectors 160, 170, the positions of the first, second, third and fourth connection points 161, 162, 171, 172, the length defined by the first connector 160 between the first and second connection points 161, 162 at a reference temperature (i.e. the first length) and the length defined by the second connector 170 between the third and fourth connection points 171, 172 at the reference temperature (i.e. the second length) are selected such that the shift in m/z ratio per Kelvin of the connectors 160, 170 can compensate for the shift in m/z ratio per Kelvin of preferably all of the electrodes of the first and second plurality of electrodes 51, 61.

The compensation may be such that a sum of the shift in m/z ratio per Kelvin of the connectors 160, 170 and all of the electrodes 51, 61 of the first and second plurality of electrodes is less than ±10 ppm/K, preferably less than ±5 ppm/K, more preferably less than ±3 ppm/K, even more preferably less than ±2 ppm/K, most preferably less than ±1 ppm.

In view of the geometry of the connectors 160, 170 and the electrodes 51, 61 (i.e. as the longitudinal direction of the connectors 160, 170 extends parallel to the spacing between the first and second plurality of electrodes 51, 61 but transverse to the longitudinal direction of the electrodes 51, 61), the connectors 160, 170 are formed of a material having a lower coefficient of thermal expansion than the material used to form the electrodes 51, 61 in order to provide the thermal compensation. The thermal expansion coefficient of the connectors 16, 170 may be ≤½ the thermal expansion coefficient of the electrode(s) 51, 61, more preferably ≤⅕ the thermal expansion coefficient of the electrode(s) 51, 61, most preferably ≤1/10 the thermal expansion coefficient of the electrode(s) 51, 61.

Preferably, the connectors 160, 170 are formed of invar, with a thermal coefficient of expansion of approximately 1-2 ppm/K, preferably 1.2 ppm/K and/or the electrodes are formed of aluminium, with a thermal coefficient of expansion of approximately 20-30 ppm/K, preferably 25 ppm/K.

While the majority of compensation can be achieved by only considering the shift in m/z ratio per Kelvin of the electrodes of the first and second plurality of electrodes 51, 61. The material of the connectors 160, 170, the positions of the first, second, third and fourth connection points 161, 162, 171, 172, the length defined by the first connector 160 between the first and second connection points 161, 162 at a reference temperature (the first length) and the length defined by the second connector 170 between the third and fourth connection points 171, 172 at the reference temperature (the second length) may be selected to compensate for the shift in m/z ratio per Kelvin of other components of the analyser in addition to the electrodes e.g. the ion source 90, the detector 70 and/or the spacers 140 between the electrodes (electrode spacers 140) etc. All of these components will expand/contract with temperature change leading to a change in the ion-flight path therethrough and a consequent change in the m/z shift measured for an ion. Therefore, each of these components has an associated shift in m/z ratio per Kelvin that can be determined based on the thermal coefficient of expansion of the material they are formed from, their geometry and dimensions.

For example, the material of the first and second connectors 160, 170, the positions of the first, second, third and fourth connection points 161, 162, 171, 172, the length defined by the first connector 160 between the first and second connection points 161, 162 at a reference temperature and the length defined by the second connector 170 between the third and fourth connection points 171, 172 at the reference temperature may be selected such that the shift in m/z ratio per Kelvin of the connectors 160, 170 can compensate for the shift in m/z ratio per Kelvin of preferably all of the electrodes of the first and second plurality of electrodes 51, 61 and the electrode spacers 140.

The compensation may be such that a sum of the shift in m/z ratio per Kelvin of the connectors 160, 170, all of the electrodes 51, 61 of the first and second plurality of electrodes and the electrode spacers 140 is less than ±10 ppm/K, preferably less than ±5 ppm/K, more preferably less than ±3 ppm/K, even more preferably less than ±2 ppm/K, most preferably less than ±1 ppm/K.

By way of further example, the material of the first and second connectors 160, 170, the positions of the first, second, third and fourth connection points 161, 162, 171, 172, the length defined by the first connector 160 between the first and second connection points 161, 162 at a reference temperature and the length defined by the second connector 170 between the third and fourth connection points 171, 172 at the reference temperature may be selected such that the shift in m/z ratio per Kelvin of the connectors 160, 170 can compensate for the shift in m/z ratio per Kelvin of preferably all of the electrodes of the first and second plurality of electrodes 51, 61, the electrode spacers 140 and the ion source 90 and the detector 70.

The compensation may be such that a sum of the shift in m/z ratio per Kelvin of the connectors 160, 170, all of the electrodes 51, 61 of the first and second plurality of electrodes and the electrode spacers 140 is less than ±10 ppm/K, preferably less than ±5 ppm/K, more preferably less than ±3 ppm/K, even more preferably less than ±2 ppm/K, most preferably less than ±1 ppm.

As discussed above, the first plurality of electrodes 51 are tilted relative to the second plurality of electrodes 61. The angle of tilt in this arrangement may be approximately 0.02-0.1°. The length defined by the second connector 170 between the third connection point 171 and the fourth connection point 172, the positions of the third and fourth connection points 171, 172 and the material of the second connector 170 may be selected such that the angle of tilt is maintained with temperature change. Preferably, the second connector 170 is formed of the same material as the first connector 160. The length of the second connector 170 between the third and fourth connection points 171, 172 at a reference temperature (i.e. the second length) is different from the length of the first connector 160 between the first and second connection points 161, 162 at the reference temperature (i.e. the first length) to accommodate the tilt angle between the first and second plurality of electrodes 51, 61. For example, on a change in temperature, the first and second connectors 160, 170 when formed of the same material will expand/contract in proportion with each other thereby maintaining the tilt angle between the first and second plurality of electrodes 51, 61. The title angle is preferably maintained within ±0.01°, most preferably within ±0.001° after thermal expansion of the electrodes 51, 61 and connectors 160, 170. In an arrangement where the first and second connectors 160, 170 are each clamped to the outer edges of the respective electrode 51, 61, as shown in FIG. 11, the angle of tilt may be obtained by inserting a spacer (not shown), referred to herein as a tilt spacer, between the electrode clamp 310 (specifically the first part 310*a* of the electrode clamp 310) and the outer edge of the respective electrode 51, 61. The thickness of the tilt spacer may be selected to obtain the desired angle of tilt. The tilt spacer may be, for example, a metal shim.

The second connector 170 is preferably only attached to the first connector 160 via the first and second electrodes 51*a*, 61*a*. In other words, there is preferably no direct connection between the first and second connectors 160, 170. Consequently, on thermal expansion of the electrodes 51, 61 in their longitudinal direction, the spacing between the first and second connectors 160, 170 increases to accommodate this expansion thereby preventing bending of the electrodes 51, 61.

The second connector 170 may be fixed to the inner surface of the vacuum chamber at a position between the third and fourth connection points 171, 172, preferably equidistantly between the third and fourth connection points 171, 172. In this preferred arrangement, the second connector 170 is fixed to the inner surface 21 of the vacuum chamber 20 with minimal contact at a fixing point 180. For example, the second connector 170 may be fixed to the inner surface 21 of the vacuum chamber 20 with a dowel pin received in a corresponding opening in the inner surface 21 of the vacuum chamber 20. By way of a further example, the second connector 170 may be fixed to the inner surface 21 of the vacuum chamber 20 at fixing point 180 using a clamp that clamps the second connector 170 to the inner surface 21 of the vacuum chamber. The clamp may be bolted to the inner surface 21 of the vacuum chamber 20. By using a clamp, the second connector 170 may be fixed to the inner surface 21 of the vacuum chamber 20 without creating a hole or slot in the second connector 170 which may otherwise weaken the connector 170. The clamp may also allow for a more rigid connection between the second connector 170 and the inner surface 21 of the vacuum chamber 20. The clamp and the second connector 170 may be made of the same material, which may avoid/reduce stress or friction that may otherwise be generated due to differing thermal expansion/contraction of the clamp and the second connector 170. By way of example, the second connector 170 and the clamp used to fix the second connector 170 to the inner surface 21 of the vacuum chamber at the fixing point 180 may be formed of invar, with a thermal coefficient of expansion of approximately 1-2 ppm/K, preferably 1.2 ppm/K. The inner surface 21 is preferably the bottom surface of the vacuum chamber 20. The first connector 160 may move relative to the second connector 170 as a consequence of the expansion of the electrodes 51, 61 along their longitudinal direction but drift of the electrode assembly as a whole within the vacuum chamber 20 is prevented due to the connection of the second connector 170 to the inner surface 21 of the vacuum chamber 20 at the fixing point 180.

Figure 6:
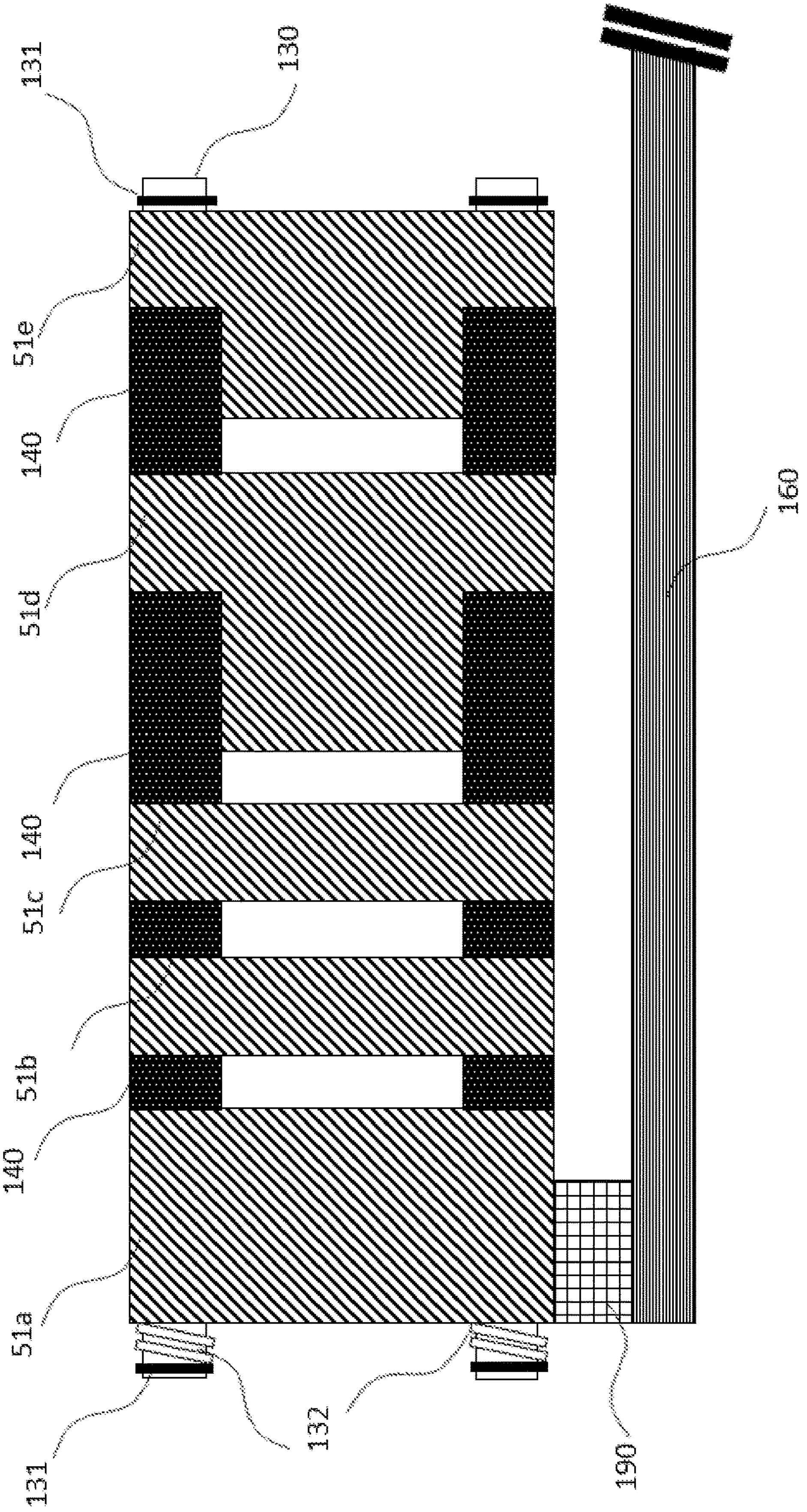
FIG. 6 shows a schematic diagram of an end view of part of the assembly of the second aspect of the present invention.

The connectors 160, 170 are preferably received within trenches (recesses or grooves) (not shown) formed within the inner surface 21 of the vacuum chamber 20, which is preferably the lower surface of the vacuum chamber. The trenches may extend along portions of the inner surface 21 of the vacuum chamber 20 underneath the electrodes 51, 61 such that the connectors 160, 170 do not contact the inner surface 21 of the vacuum chamber 20 except for at and/or around the fixing point 180 such that the fixing point 180 is not within the trenches. Accordingly, the connectors 160, 170 may not support the electrodes 51, 61. As shown in FIG. 11, one or more flexible support(s) 350 may be provided around at least a portion of the outer surface of each of the connectors 160, 170 to prevent direct contact between the outer surface of each of the connectors 160, 170 and the trenches during assembly (i.e. before the connectors 160, 170 are attached to the respective electrodes 51, 61). The flexible supports 350 may be configured to support the respective connector 160, 170 during assembly prior to connection of the connectors 160, 170 to the respective electrodes 51, 61. The flexible supports are formed of a flexible material or shaped to impart flexibility such that they enable and/or do not impede thermal expansion or contraction of the connectors 160, 170. The flexible supports may be formed of laser cut and then folded sheet metal, such as folded sheet aluminium. The flexible support(s) 350 may extend around the entire periphery of the respective connector 160, 170 or around a portion of the periphery of the respective connector 160, 170 that would otherwise contact the trench during assembly prior to connection of the connector 160, 170 to the electrodes 51, 61. As best shown in FIG. 6, the connectors 160, 170 may be connected to the electrodes 51, 61 via spacers 190, referred to herein as connector spacers 190, arranged therebetween such that the connectors 160, 170 are spaced apart from the electrodes 51, 61. The connector spacers 190 may be formed of an electrically insulative material, such as a ceramic, such that the connector spacers 190 may be electrically insulated from the respective electrode 51, 61. Alternatively, the connectors 160, 170 may be directly connected to the electrodes 51, 61.

As shown in FIG. 6, in the second aspect of the invention, the electrodes of the first plurality of electrodes 51 may be mounted on a first pair of mounting rods 130, which may be formed of a ceramic material. This arrangement is discussed in respect of the first aspect of the invention and equally applies to the first and second plurality of electrodes 51, 61 of the second aspect of the invention.

Figure 7:
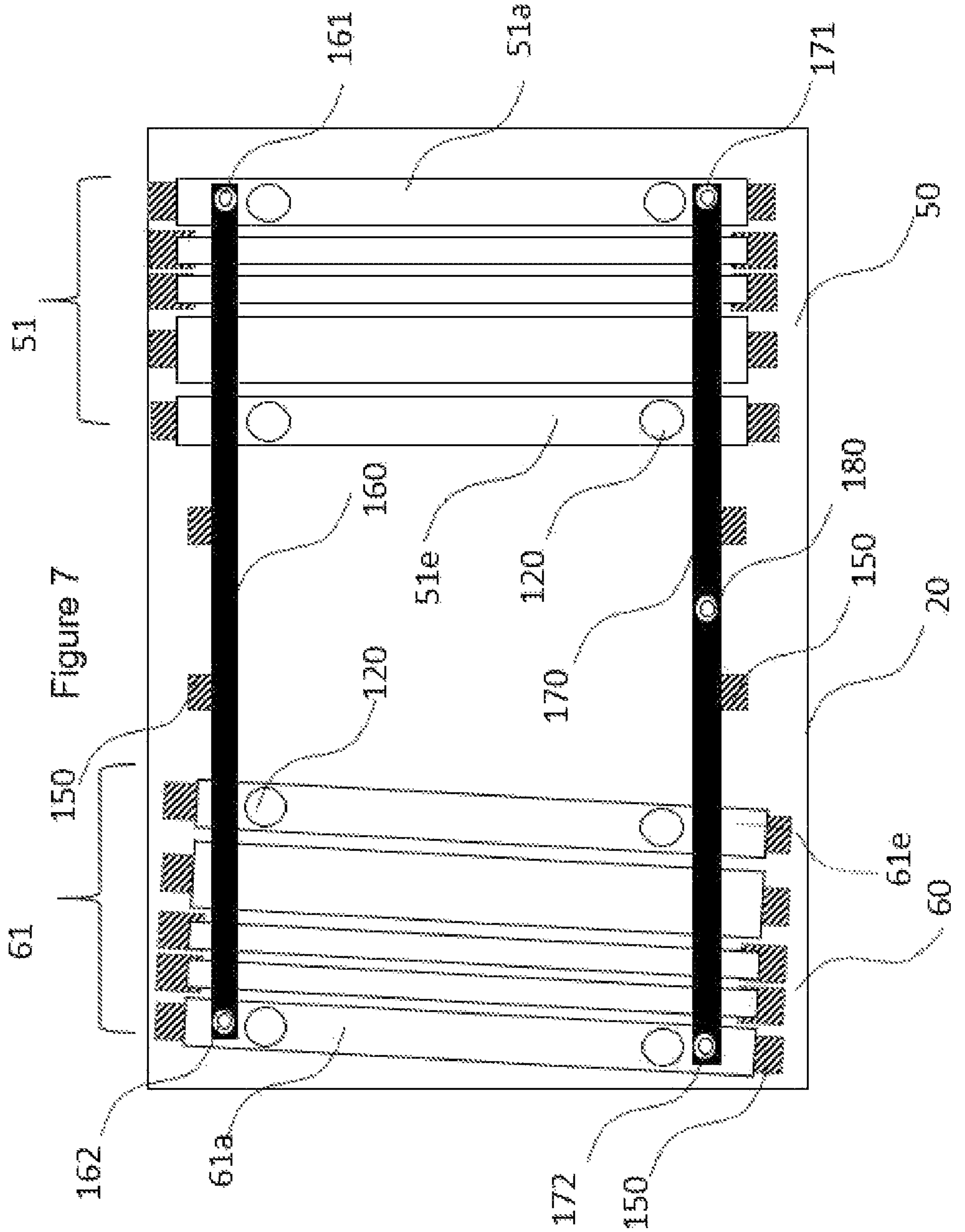
FIG. 7 shows a schematic diagram of a plan view of part of the assembly according to the first and second aspects of the present invention when viewed from below.

The features of the first and second aspects of the invention may be combined. For example, FIG. 7 shows a plan view from below of an assembly that may be used in the mr-TOF shown in FIG. 1. The assembly comprises the first and second ion-optical mirrors 50, 60 described in both the first and second aspects, the supports 120 and flexible thermal conductors 150 described in accordance with the first aspect and the connectors 160, 170 described in accordance with the second aspect.

In the arrangement of FIG. 7, the electrode(s) are thermally coupled to the inner surface 21 of the vacuum chamber 20 by the flexible thermal conductors 150 for efficient heat transfer during bake-out. This thereby improves the efficiency of the outgassing process during bake-out and reduces the time taken to cool the analyser after heating such that it is ready to use. The supports 120 supporting the electrodes 51, 61 enable relative movement between the inner surface of the vacuum chamber 20 and the electrodes 51, 61. Consequently, stress and friction forces on the electrodes 51, 61 due to thermal expansion/contracting of the vacuum chamber 20 due to heating and cooling of the vacuum chamber 20 during bake-out are minimised. Indeed, both the electrodes 51, 61 and inner surface 21 of the vacuum chamber 20 may freely expand/contract with temperature change without compromising the efficiency of heat between the inner surface 21 of the vacuum chamber 20 and the electrodes 51, 61.

Furthermore, as the supports 120 permit relative movement between the inner surface 21 of the vacuum chamber 20 and the electrodes 51, 61, thermal expansion/contraction of the vacuum chamber 20 does not significantly impact the thermal compensation scheme described in accordance with the second aspect of the invention. Indeed, the thermal expansion/contraction of the electrodes 51, 61 and thermal expansion/contraction of the connectors 160, 170 are not significantly affected by thermal expansion/contraction of the vacuum chamber 20. This is because the electrodes 51, 61 are supported by supports 120 that permit relative movement between the electrodes 51, 61 and the inner surface 21 of the vacuum chamber 20. The first connector 160 is not directly attached to the vacuum chamber 20. The second connector 170 is only attached to the vacuum chamber 20 by minimal contact (e.g. by a dowel pin) at a position (fixing point 180) between the first and second ion-optical mirrors 50, 60. Therefore, expansion/contraction of the vacuum chamber 20 on heating and cooling during bake-out does not lead to stress on the electrodes 51, 61 of the analyser.

As discussed above, the connectors 160, 170 may be connected to the electrodes 51, 61 via connector spacers 190 arranged therebetween such that the connectors are spaced apart from the electrodes 51, 61. The spacers 190 are formed of an electrically insulative material, such as a ceramic. The spacers 190 are positioned at the first, second, third and fourth connection points 161, 162, 171, 172. As discussed above, the connectors 160, 170 are received within trenches formed in the inner surface 21 of the vacuum chamber 20. The depth of the trenches is such that the connectors 160, 170 do not contact the inner surface of the vacuum chamber 20 except at the fixing point 180. Therefore, even though the connectors 160, 170 in this arrangement extend underneath the electrodes 51, 61, the connectors 160, 170 do not support the electrodes 51, 61. Instead, the electrodes 51, 61 may be entirely supported by the supports 120 that enable relative movement between the electrodes 51, 61 and the inner surface 21 of the vacuum chamber 20. Accordingly, the presence of the connectors 160, 170 does not reduce the functionality of the supports 120. The flexible thermal conductors 150 may have a cross-sectional area that is between 20-400 $mm^2$, which enables efficient heat transfer without causing bending of the connectors 160, 170. One or more flexible thermal conductors 150 may be connected between the connector(s) 160, 170 and the inner surface 21 of the vacuum chamber 20 such that the flexible thermal conductors 150 enable transfer of heat between the connector(s) 160, 170 and the inner surface 21 of the vacuum chamber. It may be beneficial to employ multiple flexible thermal conductors 150 connected to each connector 160, 170, if the connectors are formed of a material having poor thermal conductivity, such as invar.

Figure 8:
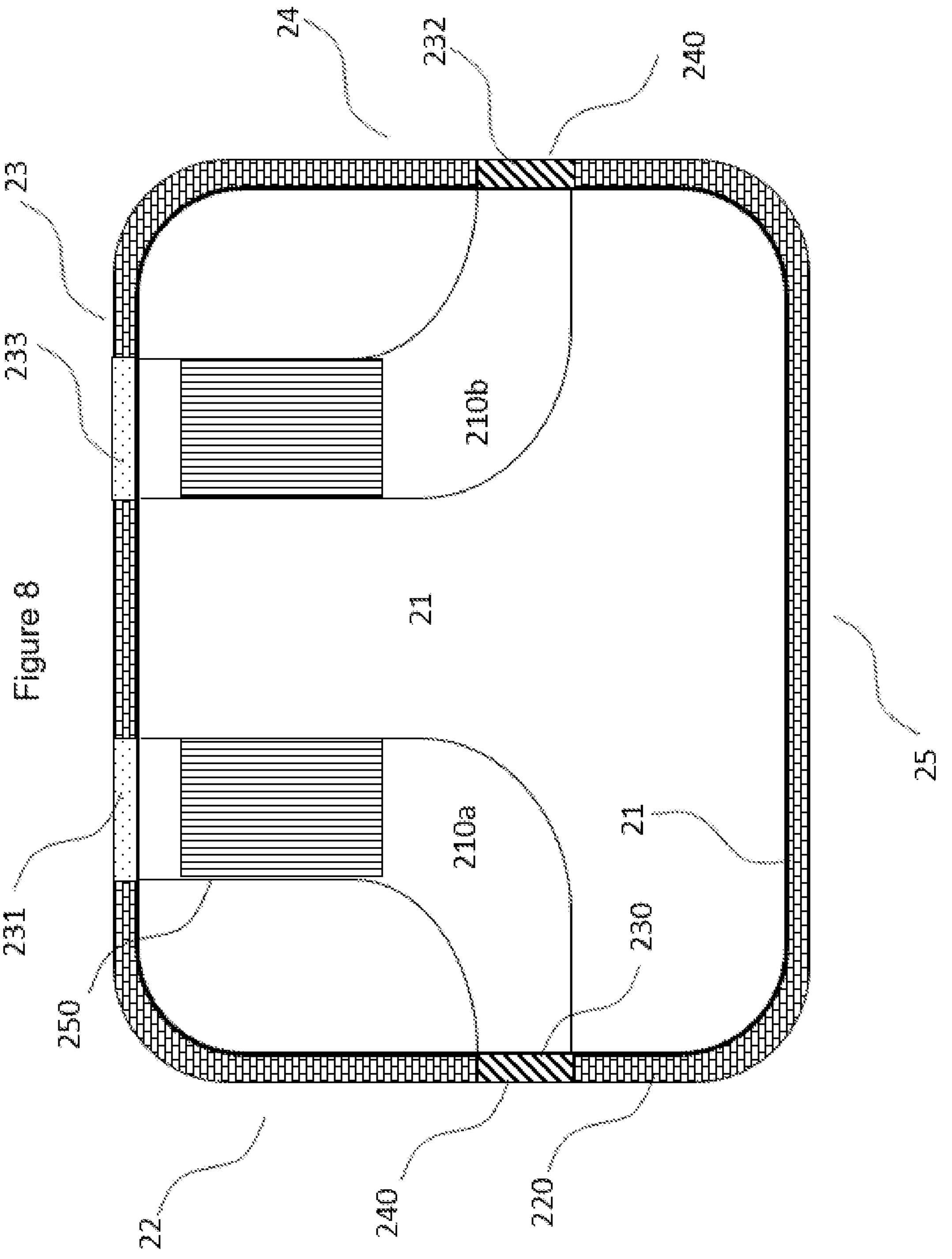
FIG. 8 shows a schematic diagram of a plan view of part of the apparatus according to the third aspect of the present invention when viewed from above with the mass analyser removed from view for clarity.

FIG. 8 is a schematic plan view diagram of part of an apparatus 200 for out-gassing to remove contaminants from surfaces 21 within a vacuum chamber 20 housing a time-of-flight mass analyser 30 by heating and subsequently cooling the surfaces. The apparatus 200 comprises one or more cooling channel(s) 210, the cooling channels 210 arranged to cool surfaces within the vacuum chamber 20 by transporting a cooling medium through the cooling channel (s) 210, a heater (not shown) arranged to heat the surfaces 21 within the vacuum chamber 20 and an insulating material 220 surrounding an outer surface of the vacuum chamber 20.

The apparatus can be employed in the assembly of FIG. 1. In other words, the assembly of FIG. 1 may comprise an insulating material 220 surrounding the outer surface of the vacuum chamber 20, cooling channels 210 arranged to cool surfaces 21 within the vacuum chamber 20 by transporting a cooling medium through the cooling channels 210 and a heater arranged to heat the surfaces within the vacuum chamber 20.

As best shown in FIG. 8, the insulating material 220 surrounds the majority of the outer surface of the vacuum chamber 20 and preferably surrounds the entire outer surface of the vacuum chamber. The insulating material 220 is preferably a foam, for example polyurethane or polypropylene foam. The heater (not shown) is preferably positioned between the insulating material 220 and the outer surface of the vacuum chamber 20. The heater may be a heating element, which may be attached to an outer surface of the vacuum chamber 20, for example by screws.

The arrangement shown in FIG. 8 comprises two cooling channels 210 referred to herein as first and second cooling channels 210*a*, 210*b*. In this preferred arrangement, each cooling channel 210 is formed as one or more recesses and/or grooves formed in the outer wall of the vacuum chamber 20, preferably the bottom, outer wall of the vacuum chamber. Each cooling channel 210 has a depth extending through part of the thickness of the outer wall of the vacuum chamber 20 such that the cooling channel is formed in the outer surface of the vacuum chamber wall and the inner surfaces of the vacuum chamber 20 remains intact. The insulating material 220 surrounding the outer surface of the vacuum chamber 20 also covers the recesses and/or grooves forming the cooling channels 210.

In the preferred arrangement of FIG. 8, the first cooling channel 210*a* extends between a first edge 22 of the bottom wall 21 and a second edge 23 of the bottom wall 21 where the first and second edges 22, 23 are substantially perpendicular to each other. The second cooling channel 210*b* extends between a third edge 24 of the bottom wall and a second edge 23 of the bottom wall 21 where the third and second edges 24, 23 are perpendicular to each other. In this preferred arrangement, the first and second cooling channels 210*a*, 210*b* are curved. By employing curved rather than straight cooling channels 210, the space employed by the cooling channels 210 is reduced such that the remaining space may be more efficiently used, for example, for positioning vacuum pumps therein. Alternatively, the first and second cooling channels 210 may extend between the first and third edges 22, 24 or the second and fourth edges 23, 25 of the bottom wall 21 where the fourth and second edges 23, 25 are parallel to each other such that the cooling channels 210 are formed as straight channels. In this preferred arrangement, the inlet 230 of the first cooling channel 210*a* is formed at the first edge 22 of the bottom wall 21 and the outlet 231 of the first cooling channel 210*a* is formed at the second edge 23 of the bottom wall 21. The inlet 232 of the second cooling channel 210*b* is formed at the third edge 24 of the bottom wall 21 and the outlet 233 of the second cooling channel 210*b* is formed at the second edge 23 of the bottom wall 21.

The cooling channels 210 may be configured to actively cool the surfaces within the vacuum chamber 20 during use. In this preferred arrangement, the cooling medium employed is a gas (preferably air). Therefore, to achieve active cooling, a fan 240 is provided proximal to the inlet 230, 232 of each cooling channel 210 to drive the cooling medium through the respective cooling channel 210. In an alternative arrangement where a liquid coolant medium is provided, then a pump may be used instead to drive the cooling medium through the respective cooling channel 210. Normally, the flow of cooling medium through the cooling channels 210 may be restricted except when the fans 240 and/or pumps are activated.

In this preferred arrangement, a heatsink 250 is provided within each cooling channel 210, preferably downstream of the fan 240. The heatsink 250 is preferably formed of extruded aluminium or copper. The heatsink 250 may be attached to the recess/groove forming each cooling channel 210 by, for example, adhesive and/or bolts. The heatsink 250 is preferably formed of extruded aluminium or copper and is configured to receive the cooling medium flowing through the cooling channel 210 during use.

Vacuum pumps are not shown in the arrangement of FIG. 8 but may be positioned between the first and second cooling channels 210*a*, 210*b*. The vacuum pumps may be partially thermally decoupled from the vacuum chamber 20 with steel plate arranged at the contact surfaces between vacuum pumps and the vacuum chamber 20.

The apparatus may further comprise a controller (not shown) configured to control activation and termination of the heater (not shown) and activation and termination of the fans 240. The controller is configured to activate the fans 240 after termination of the heater. Therefore, in use when performing out-gassing to remove contaminants from surfaces within the vacuum chamber 20 (i.e. during bake-out), the controller activates the heater such that the heater heats the surfaces 21 within the vacuum chamber 20. The efficiency of heating the surfaces within the vacuum chamber 20 is improved due to use of the insulating material 220 surrounding the outer surface of the vacuum chamber 20. For example, to achieve outgassing for a mr-TOF analyser with a 20 m flight path, the heater only needs a power supply of less than 1 KW due to the improved efficiency achieved. Once the contaminants have been removed from the surfaces 21 within the vacuum chamber 20, the controller terminates operation of the heater and activates the fans 240 such that the flow of the cooling medium (in this case air) is driven through the cooling channels 210 thereby actively cooling the surfaces 21 within the vacuum chamber 20. This therefore improves the efficiency of cooling the surfaces 21 within the vacuum chamber 20 such that the time taken for out-gassing is reduced.

This assembly is also advantageous for general use of the time-of-flight mass analyser (i.e. not just during bake-out (out-gassing)). For example, the insulation 220 also protects the mass analyser from changes in temperature in the ambient air during use.

The inventive concept of the third aspect of the present invention described in accordance with FIG. 8 and claimed is equally applicable to any form of mass analyser and the claims are to be construed accordingly.

The inventive concept of the first, second and third aspects of the present invention described above may be employed together in any combination. For example, the first and third aspects may be employed together, the first and second aspects may be employed together, the second and third aspects may be employed together or all of the first, second and third aspects may be employed together.

Experimental Data

The data in Table 1 set out below demonstrates the thermal compensation achieved by an assembly employing the second aspect of the invention where the mass analyser is a mr-TOF analyser. In other words, the assembly comprised an arrangement similar to that shown in FIGS. 5 and 6 employing a connector 160. In this arrangement, as described above, the analyser comprises a first ion-optical mirror 50 comprising a first electrode 51*a* and a second ion-optical mirror 60 comprising a second electrode 61*b*. The second ion-optical mirror 60 is spaced apart from the first ion-optical mirror 50 at a distance defining a portion of an ion-flight path therebetween. A connector 160 connected to the first electrode 51*a* at a first connection point 161 and connected to the second electrode at a second connection point 162 was employed. The first ion-optical mirror 50 comprises a first plurality of electrodes 51 and the second ion-optical mirror 60 comprises a second plurality of electrodes 61. The first electrode 51*a* is the furthest electrode of the first plurality of electrodes 51 from the second plurality of electrodes 61. The second electrode 61*a* is the furthest electrode of the second plurality of electrodes 61 from the first plurality of electrodes 51. The electrodes of the first plurality of electrodes 51 are separated by spacers therebetween 140 described above as electrode spacers 140. The electrodes of the second plurality of electrodes 61 are separated by spacers 140 therebetween. In the arrangement used to obtain the data in Table 1, the spacing between the first and second ion-optical mirrors 50, 60 employed was 8 mm.

The values for the shift in m/z per Kelvin set out in the table below were determined based on simulation of ion trajectories within the analyser system using MASIM3D software. In the table below, the electrodes 51, 61 are labelled as M0, M1, M2, M3, M4. As indicated in the table below, the electrodes 51, 61 of the first and second plurality of electrodes have the greatest impact on the total m/z shift per Kelvin. The spacers 140 between the electrodes 51, 61 have only a negligible effect on the total m/z shift per Kelvin.

In this arrangement, a connector 160 configured as shown in FIGS. 6 and 7 described above and formed of invar having a length of 632 mm between the first and second connection points is employed. In other words, the length of the connector 160 between its centre and the first connection point 161 was 318 mm and the length of the connector between its centre and the second connection point 162 was 318 mm. The sum of the shift in m/z ratio per Kelvin of the electrodes 51, 61, the spacers 140 and the connector 160 is 2.69 ppm/K. Accordingly, in this arrangement, the compensation achieved by the connector 160 configured as described in FIGS. 6 and 7 is such that the total shift in m/z ratio per Kelvin is reduced to 2.69 ppm/K.

| Component | Length/mm | Influence on m/z assignment ppm/K |
|---|---|---|
| Invar Rod (1.5 ppm/K) | ±318 (632 total) | 2.98 |
| Aluminium Electrode (22 ppm/K) M4 | 28 | 2.94 |
| Aluminium Electrode M3 | 16 | −1.98 |
| Aluminium Electrode M2 | 16 | −1.68 |
| Aluminium Electrode M1 | 46 | 1.60 |
| Aluminium Electrode M0 | 37 | −1.31 |
| AIN (4.5 ppm/K) Spacer M4/M3 | 8 | 0.00 |
| AIN Spacer M3/M2 | 8 | 0.19 |
| AIN Spacer M2/M1 | 30 | 0.12 |
| AIN Spacer M1/M0 | 24 | −0.16 |
| Total | | 2.69 |

It was found that by employing a connector 160 formed of invar and having a length of 678 mm between the first and second connection points would achieve complete compensation such that the total shift in m/z ratio per Kelvin is reduced to 0. (I.e. employing a connector 160 where the length of the connector 160 between its centre and the first connection point 161 was 339 mm and the length of the connector 160 between its centre and the second connection point 162 was 339 mm).

Figure 9:
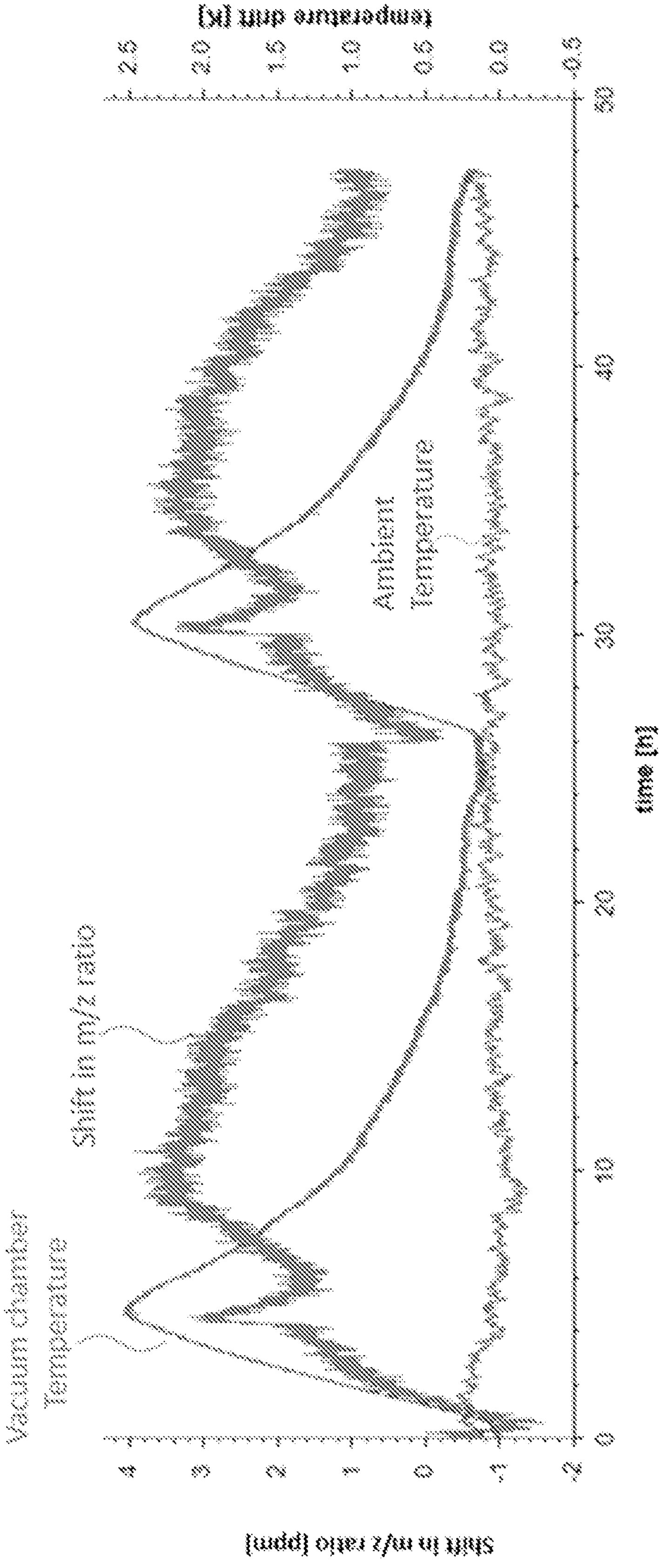
FIG. 9 is a graph demonstrating shift in m/z ratio in ppm measured with variation in temperature in Kelvin for an arrangement according to the first, second and third aspects of the invention.

FIG. 9 shows the measured change in m/z with temperature for an assembly employing the first, second and third aspects of the invention where the mass analyser is a mr-TOF analyser. In other words, the assembly comprised an arrangement similar to that shown in FIG. 7 but also comprising the features of FIG. 8. In other words, the assembly comprised the supports 120 and flexible thermal conductors 150 described in accordance with the first aspect, the connectors 160, 170 described in accordance with the second aspect and the insulating material 220, heater and cooling channels 210 described in accordance with the third aspect.

The mr-TOF mass analyser was approximately 1 $m^2$ in size and had a total ion flight path length of 21 m. The vacuum chamber 20 was heated with 50 W heating power over two twenty-four hour cycles. Flouranthene ion m/z was measured over the 48 hours of the experiment and its deviation from its initial value (i.e. prior to heating) was plotted. The change in temperature of the vacuum chamber 20 in Kelvin was measured by PT100 sensors mounted to the vacuum chamber 20. The vacuum chamber 20 reaches a thermal drift of nearly +2.5 K and the consequent shift in m/z ratio is +3.4 ppm. This therefore equates to a shift in m/z ratio per Kelvin of 1.4 ppm/K. There are anomalous changes in the shift in m/z ratio that occur over minutes while the heater is activate/deactivated when copper heatsinks are provided in the cooling channels 210. It is thought that this anomalous change may reflect stress on the chamber 20 being transferred to the ion-optical mirrors 50, 60 or movement due to rapid heating of the electrodes 51, 61. There is also some delay between the m/z shift peaks and the vacuum chamber temperature peaks due to the time taken for heat transfer to the electrodes 51, 61 of the ion-optical mirrors 50, 60 via the flexible thermal conductors 150.

Figure 10:
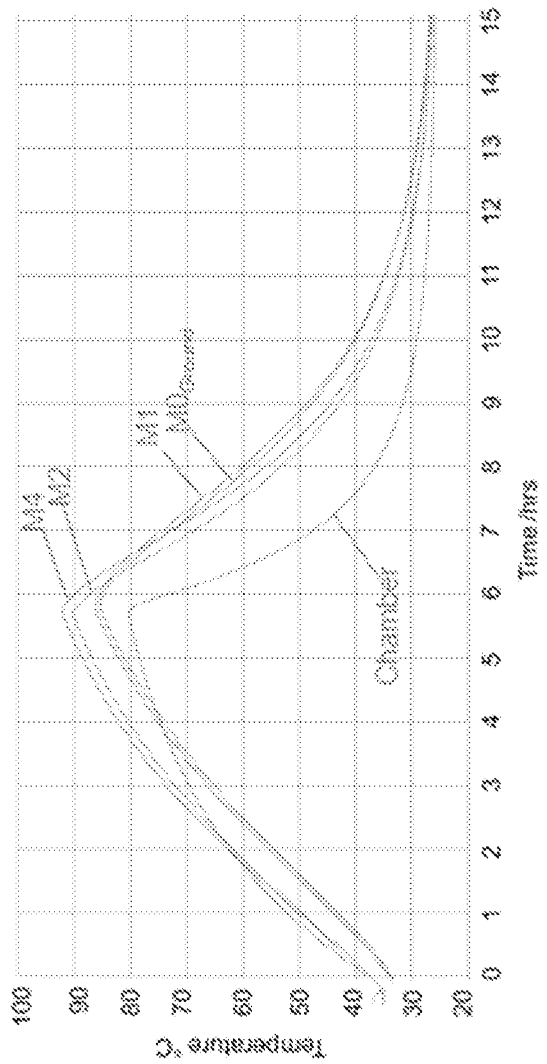
FIG. 10 is a graph demonstrating the efficiency of heating and cooling the vacuum chamber and mass analyser of the assembly of FIG. 9 during bake-out.

FIG. 10 shows the efficacy of heating and cooling this assembly with a cycle typically used for bake-out i.e. to perform out-gassing. The cycle involves 6 hours of heating followed by continuous active cooling using the cooling channels 210 having air as the cooling medium flowing therethrough. PT100 sensors were mounted to the vacuum chamber 20 and to four of the electrodes 51 of the first ion-optical mirror 50 referred to as M0 (ground), M1, M2 and M4. In FIG. 10, between 5 minutes and 10 minutes, M4 has the highest temperature followed by M2, then M1 then M0. The vacuum chamber has the lowest temperature. The lines for M1 and M0 overlap at approximately 10 minutes. It can be seen from this data that that insulating material improves the efficiency of heating the vacuum chamber and electrodes 51 of the analyser therein and the cooling channels improve the efficiency of cooling the electrodes 51 after heating. This data also shows that the flexible thermal conductor 150 provides efficient thermal coupling of the electrodes 51 and the vacuum chamber 20. Indeed, the temperature of all electrodes 51 and the vacuum chamber 20 exceeds 80° C. during, and cools well below 30° C. within 14 hours. Final base pressure within the vacuum chamber 20 where the mr-TOF mass analyser is positioned was recorded at a suitable $3\times10^{-9}$ mbar.

The invention claimed is:

1. An assembly comprising a vacuum chamber and a time-of-flight mass spectrometer, wherein the time-of-flight mass spectrometer is contained within the vacuum chamber, the time-of-flight mass spectrometer comprising:

a first electrode and a second electrode, the second electrode being spaced apart from the first electrode at a distance defining a portion of an ion-flight path therebetween;

the assembly comprising:

a first support for supporting the first electrode, the first support arranged between an inner surface of the vacuum chamber and the first electrode;

wherein the first support is configured to permit relative movement between at least a portion of the inner surface of the vacuum chamber and the first electrode; and wherein the inner surface of the vacuum chamber and the first electrode, the second electrode, or a combination thereof, are thermally coupled, and wherein the inner surface and the first electrode, the second electrode, or a combination thereof, are thermally coupled to the vacuum chamber by one or more flexible thermal conductors.

2. The assembly of claim 1, wherein the assembly further comprises a second support for supporting the second electrode, the second support arranged between the inner surface of the vacuum chamber and the second electrode, wherein the second support is configured to permit relative movement between at least a portion of the inner surface of the vacuum chamber and the second electrode, and wherein the inner surface of the vacuum chamber and the second electrode are thermally coupled.

3. The assembly of claim 1, wherein each flexible thermal conductor comprises one or more thermally conductive wires.

4. The assembly of claim 3, wherein each flexible thermal conductor comprises a first mount configured to connect the flexible thermal conductor to the respective electrode and a second mount configured to connect the flexible thermal conductor to the inner surface of the vacuum chamber, wherein the one or more thermally conductive wires extend between the first mount and the second mount, wherein the first mount and the second mount are thermally conductive.

5. The assembly of claim 4, wherein the first mount is electrically insulated from the respective electrode.

6. The assembly of claim 1, wherein the first and/or second support is thermally conductive thereby thermally coupling the inner surface of the vacuum chamber to the respective electrode.

7. The assembly of claim 1, wherein the first and/or second support comprises a surface configured to support the respective electrode thereon, wherein the surface is electrically insulative.

8. The assembly of claim 1, wherein the first and/or second support permits relative translation of the respective electrode relative to at least a portion of the inner surface of the vacuum chamber.

9. The assembly of claim 1, wherein the first and/or second support comprises one or more rotatable elements, each rotatable element having a curved surface configured to support the respective electrode thereon.

10. The assembly of claim 9, wherein each rotatable element is a ball, wherein the ball is received by a holder such that the ball is rotatable relative to the holder and wherein the holder is coupled to the inner surface of the vacuum chamber.

11. The assembly of claim 9, wherein the inner surface of the vacuum chamber comprises a complementary recess for receiving each rotatable element.

12. The assembly of claim 1, wherein the first and/or second support comprises a lubricated layer, wherein the lubricated layer is electrically insulative, wherein the first support is a first portion of the lubricated layer and the second support is a second portion of the lubricated layer, wherein the first support and the second support are integrally formed.

13. The assembly of claim 1, wherein the first and/or second support comprises a layer having a low coefficient of friction and formed of an electrically insulative material, wherein the first support is a first portion of the layer and the second support is a second portion of the layer, wherein the first support and the second support are integrally formed.

14. The assembly of claim 1, wherein the first and/or second support comprises one or more wires configured to suspend the respective electrode from the inner surface of the vacuum chamber.

15. The assembly of claim 1, wherein the first and/or second support comprises one or more springs extending between the inner surface of the vacuum chamber and the electrodes.

16. The assembly of claim 1, wherein the time-of-flight mass spectrometer is a multi-reflection time-of-flight mass spectrometer, the multi-reflection time-of flight mass analyser comprising a first ion-optical mirror comprising at least the first electrode and a second ion-optical mirror comprising at least the second electrode, the second ion-optical mirror being spaced apart from the first ion-optical mirror at a distance defining at least the portion of the ion-flight path therebetween, wherein the first ion-optical mirror comprises a first plurality of electrodes spaced apart from each other and/or wherein the second ion-optical mirror comprises a second plurality of electrodes spaced apart from each other, wherein the first electrode is the furthest electrode of the first plurality of electrodes from the second ion-optical mirror and/or wherein the second electrode is the furthest electrode of the second plurality of electrodes from the first ion-optical mirror.

17. The assembly of claim 1, wherein the time-of-flight mass spectrometer is a multi-turn time-of-flight mass spectrometer, the multi-turn time-of flight mass analyser comprising a first electrostatic sector comprising at least the first electrode and a second electrostatic sector comprising at least the second electrode, the second electrostatic sector being spaced apart from the first electrostatic sector at a distance defining at least the portion of the ion-flight path therebetween, wherein the first electrostatic sector comprises a first plurality of electrodes spaced apart from each other and/or the second electrostatic sector comprises a second plurality of electrodes spaced apart from each other, wherein the first electrode is the furthest electrode of the first plurality of electrodes from the second electrostatic sector and/or wherein the second electrode is the furthest electrode of the second plurality of electrodes from the first electrostatic sector.

18. The assembly of claim 1, wherein the first electrode has a shift in m/z ratio per Kelvin, wherein the second electrode has a shift in m/z ratio per Kelvin, the assembly further comprising a connector connected to the first electrode at a first connection point and connected to the second electrode at a second connection point, wherein the connector has a shift in m/z ratio per Kelvin, the connector defining a first length between the first and second connections points at a reference temperature;

wherein the first length, the positions of the first and second connection points and the material of the connector are selected to compensate for the sum of the shift in m/z ratio per Kelvin in the first and second electrodes.

19. A multi-reflection time-of-flight mass analyser comprising:

a first ion-optical mirror comprising a first electrode, the first electrode having a shift in m/z ratio per Kelvin, a second ion-optical mirror comprising a second electrode, the second electrode having a shift in m/z ratio per Kelvin, wherein the second ion-optical mirror is spaced apart from the first ion-optical mirror at a distance defining a portion of an ion-flight path therebetween;

a connector connected to the first electrode at a first connection point and connected to the second electrode at a second connection point, wherein the connector has a shift in m/z ratio per Kelvin, the connector defining a first length between the first and second connection points at a reference temperature;

wherein the first length, the positions of the first and second connection points and the material of the connector are selected to compensate for the sum of the shift in m/z ratio per Kelvin in the electrodes of the first and second ion-optical mirrors and a vacuum chamber comprising an inner surface thermally coupled to the first electrode, the second electrode, or a combination thereof, wherein the inner surface and the first electrode, the second electrode, or a combination hereof are thermally coupled to the vacuum chamber by one or more flexible thermal conductors.

20. The assembly of claim 1, wherein the assembly further comprises:

one or more cooling channels, the cooling channels arranged to cool surfaces within the vacuum chamber by transporting a cooling medium through the one or more channels;

a heater arranged to heat the surfaces within the vacuum chamber; and an insulating material surrounding an outer surface of the vacuum chamber.

* * * * *